US010120096B2

(12) United States Patent
Sorensen et al.

(10) Patent No.: US 10,120,096 B2
(45) Date of Patent: Nov. 6, 2018

(54) AIRBORNE ELECTROMAGNETIC SURVEY SYSTEM WITH AERODYNAMIC FRAME SEGMENTS; AND METHODS OF SURVEYING USING SUCH

(71) Applicant: Selskabet af 6. April 2010 ApS, Aarhus N (DK)

(72) Inventors: Kurt I. Sorensen, Horning (DK); Kristoffer Mohr Rasmussen, Malling (DK)

(73) Assignee: Selskabet of 6. April 2010 ApS, Aarhus N (DK)

(*) Notice: Subject to any disclaimer, the term of this patent is extended or adjusted under 35 U.S.C. 154(b) by 0 days.

(21) Appl. No.: 15/122,135

(22) PCT Filed: Feb. 25, 2015

(86) PCT No.: PCT/DK2015/050037
§ 371 (c)(1),
(2) Date: Aug. 26, 2016

(87) PCT Pub. No.: WO2015/127939
PCT Pub. Date: Sep. 3, 2015

(65) Prior Publication Data
US 2016/0377759 A1 Dec. 29, 2016

(30) Foreign Application Priority Data

Feb. 28, 2014 (DK) .................. 2014 70093

(51) Int. Cl.
*G01V 3/165* (2006.01)
*G01V 3/16* (2006.01)

(52) U.S. Cl.
CPC .............. *G01V 3/165* (2013.01); *G01V 3/16* (2013.01)

(58) Field of Classification Search
None
See application file for complete search history.

(56) References Cited

U.S. PATENT DOCUMENTS

| 6,244,534 B1* | 6/2001 | Klinkert ............... G01V 3/165 244/1 TD |
| 2009/0212778 A1 | 8/2009 | Kuzmin et al. |

(Continued)

FOREIGN PATENT DOCUMENTS

| CA | 2 514 609 A1 | 8/2004 |
| CA | 2 776 708 A1 | 8/2012 |

(Continued)

OTHER PUBLICATIONS

International Search Report and Written Opinion dated May 8, 2015 for corresponding PCT Patent Application No. PCT/DK2015/050037, 11 pages.

*Primary Examiner* — Jermele M Hollington
*Assistant Examiner* — Douglas X Rodriguez

(57) ABSTRACT

An airborne electromagnetic survey system for geophysical prospecting comprising: a frame with a frame front section opposite a frame tail section, the frame configured to be lifted and towed by an aircraft via a tow arrangement during survey operation, the frame configured to support a transmitter coil configured to transmit an magnetic moment, wherein the frame comprises multiple frame segments, at least one of the frame segments comprising a first connection and a second connection for connecting to another one of the frame segments, a structural support providing a rigid structure between the first and second connections, and a frame segment surface providing the frame segment with an aerodynamic profile, wherein the aerodynamic profile is configured to provide aerodynamic properties to the frame, and wherein when the frame is towed by the aircraft, the (Continued)

frame has substantially a fixed frame shape and is substantially in a fixed operational orientation.

46 Claims, 14 Drawing Sheets

(56) References Cited

U.S. PATENT DOCUMENTS

2011/0001480 A1\* 1/2011 Kuzmin ................ G01V 3/165
324/330
2013/0307545 A1 11/2013 Morrison et al.

FOREIGN PATENT DOCUMENTS

| WO | WO 92/19989 A1 | 11/1992 |
| WO | WO 99/32905 A1 | 7/1999 |
| WO | WO 2004/046761 A1 | 6/2004 |
| WO | WO 2004/072684 A1 | 8/2004 |
| WO | WO 2009/105873 A1 | 9/2009 |
| WO | WO 2011/047472 A1 | 4/2011 |
| WO | WO 2013/170340 A1 | 11/2013 |
| WO | WO 2014/169317 A1 | 10/2014 |

\* cited by examiner

AIRBORNE ELECTROMAGNETIC SURVEY SYSTEM WITH AERODYNAMIC FRAME SEGMENTS; AND METHODS OF SURVEYING USING SUCH

RELATED APPLICATION DATA

This application is the national phase of International Patent Application No. PCT/DK2015/050037, filed on Feb. 25, 2015, pending, which claims priority to and the benefit of Danish Patent Application No. PA 2014 70093, filed on Feb. 28, 2014.

FIELD

This disclosure relates to an airborne electromagnetic survey system configured for geophysical prospecting comprising an aircraft configured to lift and tow via a tow arrangement during survey operation in air in a flight direction and with a flight speed. The system comprises a frame with a frame front section in the flight direction and opposite a frame tail section configured to be lifted and towed by the aircraft via the tow arrangement and to support a transmitter coil configured to transmit a magnetic moment for geophysical prospecting, which frame comprises multiple frame segments, each frame segment comprising: a first connection and a second connection for connecting to another frame segment, a structural support providing a rigid structure between the first connection and the second connection, and a frame segment surface providing the frame segment with an aerodynamic profile in the flight direction, which aerodynamic profile is configured to provide aerodynamic properties to the frame, so that when towed by the aircraft via the tow arrangement during survey operation in the flight direction, the frame having substantially a fixed frame shape and substantially being in a fixed operational orientation.

BACKGROUND

Geophysical prospecting by application of electromagnetic surveys where a primary electromagnetic field is generated to induce a secondary electromagnetic field in an underground formation has become widespread. During the last decades, survey systems for performing such prospecting have become airborne. An airborne electromagnetic system may comprise a tow assembly connected to an aircraft, typically a helicopter, and further comprising a transmitter system for generating the primary electromagnetic field that induces the secondary electromagnetic field in the underground formation. The tow assembly tows a frame that supports the transmitter system and/or a receiving system. In other embodiments, the airborne electromagnetic system may be configured on an airplane.

Such systems are known from patent applications WO2004/046761 and WO2009/105873. Electromagnetic survey systems for geophysical prospecting are disclosed in CA2514609C and CA2776708C.

Generally larger primary electromagnetic fields have demanded larger frames and larger aircrafts. The larger frames covering hundreds of square meters require use of different materials and constructions. Besides larger frames also more complicated tow arrangements are provided to compensate for undesired effect such as changes in shape or changes in orientation during operation.

Larger and more complicated tow arrangements have shown to be difficult to handle during flight.

A one solution may be to use an "active" i.e. a propelled aircraft as a "frame" to support the transmitter, but such solution will introduce further complications.

It is an objective to overcome limitations of the prior art.

SUMMARY

This may be achieved according to an airborne electromagnetic survey system configured for geophysical prospecting comprising an aircraft configured to lift and tow via a tow arrangement during survey operation in air in a flight direction and with a flight speed. The system comprises a frame with a frame front section in the flight direction and opposite a frame tail section configured to be lifted and towed by the aircraft via the tow arrangement and to support a transmitter coil configured to transmit a magnetic moment for geophysical prospecting, which frame comprises multiple frame segments, each frame segment comprising: a first connection and a second connection for connecting to another frame segment, a structural support providing a rigid structure between the first connection and the second connection and a frame segment surface providing the frame segment with an aerodynamic profile in the flight direction, which aerodynamic profile is configured to provide aerodynamic properties to the frame, so that when towed by the aircraft via the tow arrangement during survey operation in the flight direction, the frame having substantially a fixed frame shape and substantially being in a fixed operational orientation.

It is understood that the airborne electromagnetic system may comprise a transmitter system for generating the primary electromagnetic field that induces the secondary electromagnetic field in the underground formation or the formation to be surveyed. The tow assembly or the frame may support the transmitter system and/or a receiving system in various configurations.

The frame may be understood to be a "passive" frame that is aerodynamically stable and substantially in a fixed operational orientation when towed by an "active" aircraft. That is the aircraft is the propeller system and the frame is a support for at least and essentially the transmitter coil system. The frame may be configured for supporting other parts of the survey system.

Essentially the fixed frame shape is a rigid frame formed with a fixed shape. In an embodiment the gravity pulls the frame segments downwards and forms a sufficiently rigid frame.

Furthermore, the aerodynamic properties may provide forces that are acting on the frame so that the frame remains in an essentially fixed shape during operation.

The effect of having a frame with an essentially fixed shape during operation is that the transmitter coil being supported by the frame remains essentially in the same shape during operation and thus provides an essentially constant magnetic moment during operation. Furthermore, if the receiver coil is placed on the frame, it ensures a fixed position between the transmitter and the receiver coils.

A person skilled in the art will appreciate that rather than providing a complicated tow arrangement with many compensation lines, providing frame segments with aerodynamic properties a fixed shape and a steady orientation may be achieved. This will improve the overall quality of the survey data. Alternatively, a simpler tow arrangement will be needed or a combination of an improved measurement and a simpler tow arrangement.

In particular it has been found that even small deviations in shape will result in undesirable measurements such as bias in the measurements.

For instance, it has been observed that when an essentially planar configuration of the transmitter coil experiences deviations from a planar and horizontal orientation (say X-component), then other components (say Y- and Z-components) of the primary field excite undesirable fields in the underground formation to a disturbing level when it is desired to measure say X-, Y-, and Z-components of the secondary field.

Furthermore, the aerodynamic profile may be configured so that it contributes to the frame being in an essentially fixed operational orientation. A person skilled in the art will appreciate that an orientation of the frame may be given as a normal or in principle any other fixed vector being defined from the shape of the frame.

One effect of this is that more accurate or consistent measurements can be obtained. A further effect is that useful measurements may also be achieved at higher operational or flight speeds.

In an embodiment the aircraft is a helicopter. A special advantage is that the helicopter can take off in remote areas and at places with little space. Another advantage is that a helicopter can operate more accurately. This includes areas with obstructions or at altitudes where an aircraft may not fly. The helicopter can operate at lower altitudes and hence get more detailed measurements from the Earth formation.

Overall it becomes possible to operate a frame with a sufficiently fixed shape, in a sufficiently fixed orientation, preferably in an essentially horizontal plane, at a higher operational speed and/or at longer operational ranges.

According to an embodiment of the airborne electromagnetic survey system at least one of the at least one frame segment is configured with an aerodynamic profile with a drag coefficient when towed by the aircraft via the tow arrangement and during survey operation in the flight direction, the frame having a drag coefficient less than the drag coefficient resulting from using a frame segment with a circular cross section extending between the first connection and the second connection.

It is understood that at least one frame segment of the at least one aerodynamic profile may have a drag coefficient that is less than the drag, had the least one frame segment been with a circular cross section.

It is understood that prior art frames are as a whole or by connecting frame segments. A person skilled in the art may have tried to obtain a rigid frame by constructing a grid- or lattice type frame structure. Likewise, the person skilled in the art would be occupied with obtaining a fixed shape and would at best use a frame segment with a circular cross section.

It is understood that conventional ways would result in drag forces on the frame that are no less than the drag forces resulting from a frame with a frame segment with a circular cross section. In fact, obtaining a more fixed orientation or fixed shape the person skilled in the art would construct a more complex structure such as a grid structure with a profile resulting in larger drag forces and then seek to compensate by having a more powerful aircraft or compensate forces by adjusting or altering the tow arrangement.

It is understood that by using an aerodynamic profile, a person skilled in the art will configure a frame segment to active an aerodynamic profile that results in a drag force during operation that is less than using a frame segment with a circular profile. The person skilled in the art led in the direction of configuring the aerodynamic profile will appreciate that some experimentation may be needed to obtain an optimum result, i.e. a reduced drag coefficient compared to the drag coefficient of an equivalent frame segment having a circular cross section.

In one view, a lattice structure will result in very turbulent flow during operation. Even a frame section with a circular profile will result in a relatively turbulent flow during operation. As such an aerodynamic profile, that is better than the circular profile, is understood as a profile that is configured so that the turbulence is less. An aerodynamic profile with reduced drag according to this disclosure may have a transition to a turbulent flow at higher speeds.

An effect of a reduced drag coefficient is that less tow power is needed for a particular operation than otherwise. This results in less fuel consumption, larger operational range, and possibility of higher operational speed.

Another effect is that the wires in the tow arrangement can be thinner or lighter. This has the further effect that drag is further reduced.

According to an embodiment of the airborne electromagnetic survey system at least one of the least one frame segment has an aerodynamic profile of an airfoil with a leading edge in the direction of the flight direction and opposite a trailing edge.

In an aspect the airfoil is configured to stabilise the orientation of the frame during operation.

By an airfoil may be understood a profile or cross section where there is distinctively a pressure side and a suction side. In an embodiment the lower side is the pressure side and the upper side is the suction side, and thus at least one frame segment provides a lift or flight properties to the frame when in operation.

In a situation where the lower side being the pressure side provides is towed through the air during operation, the frame segment will provide a lift force. Likewise the suction side may provide a lift force.

The airfoil profile may be configured according to operational conditions at a certain operational speed or in an interval.

According to an embodiment of the airborne electromagnetic survey system at least one of the at least one frame segment has at least part of the frame segment surface configured as a vortex generator.

Thus the vortices may onset at a certain speed or a certain angle of attack so as to generate stall so that at onset, the frame segment will reduce or all together loose lift. Thus such vortex generator may be configured so that the frame for a certain weight will have a profile that will have net forces in the direction of the gravitational field.

According to an embodiment of the airborne electromagnetic survey system at least one of the at least one frame segment has at least part of the frame segment surface configured for generating a boundary layer with a turbulent flow for a drag coefficient when towed by the aircraft via the tow arrangement and during survey operation in the flight direction, the least one frame segment having a drag coefficient less than the drag coefficient resulting from using a frame segment with a surface configured for generating a boundary layer with a laminar flow when towed by the aircraft via the tow arrangement and during survey operation in the flight direction.

The effect of the boundary layer is that it may generate micro turbulence in such a way that the drag is reduced. One way this is achieved is that the vortex generator prolongs the transition from an essentially laminar flow to a turbulent flow. Another effect of the boundary layer may be to induce a difference between one side and another side of a frame segment so as to effectively generate a pressure side and/or a suction side.

According to an embodiment of the airborne electromagnetic survey system the at least one frame segment has an aerodynamic profile providing the at least one frame segment with a lift force when towed by the aircraft via the tow arrangement and during survey operation in the flight direction.

In general a frame segment may be configured with an aerodynamic profile that will result in a lift force when towed at operational speed. This will reduce fuel consumption, extend the operational range, or allow for increased operational speed; or combinations thereof. The lift of a frame segment may also be configured so that parts of the frame have individual lift so that the frame segment and/or frame maintain an essentially fixed shape and fixed orientation during operation.

According to an embodiment of the airborne electromagnetic survey system at least one of the at least one frame segment has an aerodynamic profile providing the frame with a lift force when towed by the aircraft via the tow arrangement and during survey operation in the flight direction.

Thus, the frame as such will experience a lift during operation. This means that the aircraft will essentially experience towing a lighter object that otherwise.

In an embodiment each frame segment provides a lift. In another embodiment the frame segments are organised so that the frame as a rigid object results in lift.

According to an embodiment of the airborne electromagnetic survey system wherein at least one of the at least one frame segment has an aerodynamic profile providing the frame with a lift force when towed by the aircraft via the tow arrangement and during survey operation in the flight direction, which lift force is in the opposite direction and in the same order and less than the gravitational force on the frame.

Thus, the frame as such will tend to maintain in certain orientation during operation. In an embodiment the aerodynamic profile is configured so that a force or moment is generated According to an embodiment of the airborne electromagnetic survey system wherein at least one of the at least one frame segment has an aerodynamic profile providing the frame with a stabilising force towards the intended operational orientation of the frame.

A preferred operational orientation is so that the transmitter coil spans as large an area projected onto the ground as possible. The frame is essentially horizontal in this situation and the desirable orientation is horizontal. In an embodiment frame segment is configured with an aerodynamic profile that will stabilise the frame and thus the transmitter coil towards the horizontal orientation.

According to an embodiment of the airborne electromagnetic survey system at least one of the at least one frame segment has an aerodynamic profile providing the frame tail section with a lift force when towed by the aircraft via the tow arrangement and during the survey operation providing a stabilising pitch moment.

This will stabilise the frame that tends pitch due to changes in operational speed, direction, gusts or unexpected aerodynamic forces caused by changes in weight distributions.

The frame may be rigid and thus the lift force will tend to press down the front or nose section of the frame.

The lift force provided to the tail section may be in the opposite direction of the gravitational force or it may be in the same direction as the gravitational force.

According to an embodiment of the airborne electromagnetic survey system at least one of the at least one frame segment has an aerodynamic profile providing the frame with a lift force when towed by the aircraft via the tow arrangement and during the survey operation providing a stabilising roll moment.

Similarly, such frame segment will stabilise the frame so as to maintain an essentially fixed orientation and to minimise or avoid rolls during operation. Such rolls may come due to gusts, side winds or changes in operational direction resulting in the frame experiencing sideways forces that may cause the frame to swing or wobble.

Such swings may cause undesirable generation of electromagnetic fields that would otherwise need to be accounted for and possibly eliminated. Alternatively, the operation must be halted until the swings including rolls have been damped to a sufficient degree for the prospecting to be continued or initiated. Such waits all together results in use of operational resources and thus limits the operation range.

According to an embodiment of the airborne electromagnetic survey system at least one of the at least one frame segment is configured with at least one spoiler configured to provide an aerodynamic profile with drag coefficient less than that of aerodynamic profile of the frame segment without the spoiler when towed by the aircraft via the tow arrangement and during the survey operation.

In this embodiment the aerodynamic properties may be configured by means of a spoiler attached to a frame segment or the frame. The frame segment may be lattice structure or have a circular cross section; in either case the spoiler will provide the desired aerodynamic properties to either reduce drag or provide stabilising moments to maintain a fixed orientation during operation.

Likewise, a spoiler may be an addition to frame segments or the frame already being configured with aerodynamic properties. A spoiler may further enhance the stability. A spoiler may correct for minor deviations from a desired operational orientation or experienced increased drag. A spoiler may also be applied to correct for conditions during operation. This may be side winds.

Also spoilers may be disposable and releasable. Thus a frame can be equipped with spoilers to optimise aerodynamic properties for e.g. transport and then be released to commence prospecting with optimised aerodynamic properties for prospecting.

According to an embodiment of the airborne electromagnetic survey system at least one of the at least one frame segment is configured with at least one spoiler configured to provide an aerodynamic profile that will provide a lift force to the frame segment when towed by the aircraft via the tow arrangement and during the survey operation.

In particular, one or more spoilers may be attached to the frame to provide lift to the whole frame optimised for transport whilst allowing for less stability. In particular the spoilers may be configured to provide lift at a transport speed different from an operational speed.

Spoilers may be configured to reduce drag, to stabilise pitch or to stabilise roll. Spoilers may also be configured to provide lift.

According to an embodiment of the airborne electromagnetic survey system the least one frame segment has an aerodynamic profile that is adjustable.

Thus, adjustments may be performed to further optimise the flight characteristics of the frame during operation and according to operational conditions.

The adjustments may also allow for the frame to be configured optimally for transport and optimally for operation, i.e. surveying. As such the frame may have a transport mode and a survey mode.

In the transport mode the aerodynamic profile may be optimised to reduce drag and with a certain lift to reduce fuel consumption.

In the operational mode the aerodynamic profile may be optimised to provide stabilisation to obtain a fixed operational orientation.

In principle multiple operational modes may be configured depending on the particular prospecting task and tolerances required.

According to an embodiment of the airborne electromagnetic survey system the frame has a first aerodynamic profile with aerodynamic properties primarily for survey operation so that when towed by the aircraft via the tow arrangement during survey operation in the flight direction, the frame having substantially a fixed frame shape and substantially being in a fixed survey operational orientation; and a second aerodynamic profile with aerodynamic properties primarily for ferry operation, so that when towed by the aircraft via the tow arrangement during ferry operation in the flight direction, the frame having substantially a fixed frame shape and substantially being in a fixed ferry operational orientation.

Thus, the survey system can operate in two distinct modes. The operational mode may be optimised for stability of shape of the frame or the transmitter coil and for stable flight. The ferry mode may be optimised for transport i.e. speed and fuel consumption.

According to an embodiment of the airborne electromagnetic survey system the first connection or the second connection is configured to form a rigid connection between one frame segment and adjacent frame segments.

Thus, two adjacent frame segments may be connected to form an essentially rigid new frame section.

Applying only connections (first, second, first, second, . . . ) configured to form a rigid connection between the frame segments will result in an essentially rigid frame.

A connection may be an interlock connection applied to connect a first frame segment to a second frame segment.

A connection may be configured as part of a frame segment. In an embodiment one end of a frame segment may have a recess part (female) and the other end a complementary part (male) so configured that frame segments, when connected, form a rigid structure. In particular the connection is also configured so that frame segment cannot dislocate laterally.

According to an embodiment of the airborne electromagnetic survey system the structural support is made of a composite material.

Thus, providing sufficient strength and rigidity and at the same time a sufficient low weight.

The structural support may be a beam or a grid. The aerodynamic profile may be provided by a separate layer or sheet. The structural support may also be formed as a shell that provides rigidity and aerodynamic profile, in whole or in part.

A composite material also allows for configuring the frame segment in the desired aerodynamic profile.

According to an embodiment of the airborne electromagnetic survey system the structural element is made of a rigid material, such as a fibre glass and epoxy type structure, a aramide type fibre structure, a mixed fibre glass and carbon fibre type structure, an all carbon fibre type structure, or a natural fibre type structure.

A person skilled in the art will find that any one of those construction types or compositions will be suitable starting points to make the structural part of the frame segment or the frame segment as such. Refinement of the surface may be required to obtain the desired aerodynamic profile. In particular polishing the structure or applying a final layer such as paint or lacquer is considered parts of the construction process.

A person skilled in the art will also appreciate that the types of materials are starting points and detailed information about the process steps are well described in the literature. In particular, a person skilled in the art will be able use aramide type fibre structures and to choose amongst different compositions of Poly-paraphenylene terephthalamide branded and almost generically known as Kevlar either in the literature or product sheets from suppliers including DuPont Inc.

According to an embodiment of the airborne electromagnetic survey system each first connector and second connector are configured to form a rigid frame.

Thus, the frame will essentially form a fixed shape due to structural features of the connections between frame segments. It is understood that the frame may slightly flex or bend, but essentially span the transmitter coil in a fixed shape.

According to an embodiment of the airborne electromagnetic survey system at least part of the structural element between the first connection and the second connection is a beam with a cross section with an I-profile shape.

This embodiment provides a structural stability that reduces the flexing and bending of a frame segment or the frame all together whilst at the same time using a sufficiently light construction. Also, an I-profile allows space for and/or protection of the transmitter coil. If so needed, an II-profile may be used to further strengthen one or more frame sections and provide support for a desired aerodynamic profile. Finally, an II-profile may further protect the transmitter coil. In particular if the transmitter coil is located in between the Is.

The structural element may be a beam, with an I-profile, extending between the first and second connection or the length of the frame section.

According to an embodiment of the airborne electromagnetic survey system at least part of the structural support between the first connection and the second connection is a grid type construction.

An equivalent to the grid type construction may be a lattice structure. A person skilled in the art may construct a grid type construction by using elements with aerodynamic properties as outlined and connect those elements in a grid or lattice structure to provide rigidity or further provide rigidity.

In one embodiment a first and a second shell structure extend between a first and a second connection. At least one shell structure may have an aerodynamic profile as disclosed. The first and second shell structures may be arranged relatively to each other and connected by spacers providing the structural stability. The top bar in the I may be such shell structure and the bottom bar in the I may be such shell structure.

Likewise, multiple shell structures may be configured relatively to each other to form a lightweight frame structure.

The spacers may be configured with an aerodynamic profile in particular to reduce drag.

According to an embodiment of the airborne electromagnetic survey system at least part of the structural support between the first connection and the second connection is a shell structure forming the aerodynamic profile.

According to an embodiment of the airborne electromagnetic survey system at least part of the structural support between the first connection and the second connection is a stiff foamed structure providing stiffness.

According to an embodiment of the airborne electromagnetic survey system at least part of the frame segment surface between the first connection and the second connection is a shell structure forming at least part of the aerodynamic profile.

According to an embodiment of the airborne electromagnetic survey system at least part of the shape of the frame segment surface is formed by a sheet type structure forming the at least part of the aerodynamic profile.

Such shell structure has been found to have a sufficient strength and an acceptable weight. The shell structure has an outside surface which is finished to obtain an aerodynamic profile as disclosed. The shell structure has an inside, which inside is configured to support the transmitter coil. The inside of the shell structure may further be configured to support or encapsulate survey equipment.

A foam may provide further structural strength at a very low cost in weight. Furthermore, foam has the advantage of fixing the transmitter coil and even further protect the transmitter coil and other prospecting equipment. Finally, form can relatively easy be removed to change or repair equipment before possibly reforming the frame segment.

According to an embodiment of the airborne electromagnetic survey system wherein at least part of the shape of the frame segment surface is formed by a foamed material forming at least part of the aerodynamic profile.

In such embodiment a structural element such as a beam with an I-profile may be fitted with the transmitter coil and possibly other prospecting equipment and then encapsulated in a foam that may be formed in the desired aerodynamic profile. A person skilled in the art may polish the foam or add a final layer of say paint or hardener to form a robust final surface.

According to an embodiment of the airborne electromagnetic survey system the frame is a rigid frame.

In an embodiment the frame is configured to be essentially rigid. In particular with respect to the overall shape spanning the transmitter coil in essentially a plane.

In embodiments the rigidity may be extended so that the frame does not easily bend either in front-tail direction or in the left-right direction. A person skilled in the art will appreciate that some flexibility in those directions may be acceptable for the frame not to be fragile or to cause bends on the frame during normal handling during take-off and landing.

A person skilled in the art will aim to make the frame rigid to a degree where stabilising forces at one part or end of a frame will transmit to another part or another end of the frame to an extend that the frame will act as a single structure without causing resonances or other counter forces.

According to an embodiment of the airborne electromagnetic survey at least one of the least one frame segment has an aerodynamic profile providing the frame tail section with a lift force in the direction of the gravitational force when the frame tail section is above the intended operational orientation of the frame to provide a pitch moment to bring the frame towards the intended operational operation.

According to an embodiment of the airborne electromagnetic survey the least one frame segment has an aerodynamic profile providing the frame tail section with a lift force in the opposite direction of the gravitational force when the frame tail section is below the intended operational orientation of the frame to provide a pitch moment to bring the frame towards the intended operational operation.

According to an embodiment of the airborne electromagnetic survey system the frame has a polygonal shape.

One or more frame segments may constitute sides in the polygon. In particular a hexagon shape has been found to be advantageous. In such configuration two sides formed in an arrow in the flight direction may form a front section. Two parallel sides arranged in the flight direction may form a middle section. Two sides formed in an arrow opposite the flight direction may form the tail section. In an embodiment the sides have the same lengths, which span the transmitter coil to the largest extend. In an embodiment the hexagon elongated in the flight direction, i.e. the two middle sections are closer to each other compared to other opposite sides. Such configuration has been found to provide a balance between flight or aerodynamic properties of the frame and the area spanned by the frame.

According to an embodiment of the airborne electromagnetic survey system the tow arrangement is configured to adjust the angle of attack of the frame to the direction of flight.

Thus, the frame's orientation can be adjusted during operation. Furthermore, the frame or frame segments may have their angle of attack adjusted during flight. In an embodiment the aerodynamic profile or properties may for one angle of attack be configured for transport and with another angle of attack for operations According to an embodiment of the airborne electromagnetic survey system the tow arrangement is configured to attach to the frame by less than ten tow lines such as three tow lines or six tow lines.

Configurations disclosed herein have been found to allow operation with a reduced number of the required number of tow lines or wires as otherwise found to be required. A further advantage of this is that the tow lines or wires themselves amount to substantial drag during operation. Limiting the required number of tow lines thus further allows for operation at higher speed or for longer distances.

According to an embodiment of the airborne electromagnetic survey system the magnetic moment is 500,000 Am2 or more.

The embodiments disclosed herein are understood to support equipment for prospecting at those levels. A person skilled in the art may at the same time use multiple moments with lower magnetic moments. Likewise, standard equipment may also comprise use of a larger frame, ie. larger area, but use a smaller current.

According to an embodiment of the airborne electromagnetic survey system the weight of the frame and the transmitter coil is 350 kg or more.

The embodiments disclosed herein are understood to support equipment for prospecting at those weights to achieve meaningful prospecting.

In an aspect, one or more embodiments disclosed herein may be achieved by a frame or an airborne electromagnetic frame as disclosed.

Such a frame may be an airborne electromagnetic survey transmitter frame configured for geophysical prospecting by an aircraft configured to lift the frame tow via a tow arrangement during survey operation in air in a flight direction and with a flight speed. The frame comprises a frame front section in the flight direction and opposite a frame tail section configured to be lifted and towed by the aircraft via the tow arrangement and to support a transmitter coil configured to transmit a magnetic moment for geophysical prospecting, which frame comprises multiple frame segments each frame segment comprising a first connection and a second connection for connecting to another frame segment, a structural support providing a rigid structure between the first connection and the second connection, a frame segment surface providing the frame segment with an aerodynamic profile in the flight direction, which aerodynamic profile is configured to provide aerodynamic properties to the frame, where multiple segments are configured to support the transmitter coil so that the frame substantially defines the shape of the transmitter coil and so that the frame is substantially rigid. The frame is arranged and so that when towed by the aircraft via the tow arrangement during survey operation in the flight direction, the frame having substantially a fixed frame shape and being substantially in a fixed operational orientation when the frame experiences a true air speed.

The frame may also be configured to support the receiver including a receiver coil arrangement.

A person skilled in the art and with experience airborne geological surveys or flight in general will know that some adjustments may be needed. However, the person skilled in the art will certainly appreciate that means or features are provided for such adjustments. In particular a person skilled in the art facing divergence from the desired behaviour will readily or with some trial and error be enabled to perform corrective measures by adjusting the aerodynamic properties of the frame to achieve operation of a frame that is substantially a fixed frame shape and being substantially in a fixed operational orientation when the frame experiences a true air speed.

According to an embodiment of the airborne electromagnetic survey system or a frame, the frame may have a port side and starboard side each comprising at least one section of at least one frame segment where each part side section and starboard section is essentially parallel to the flight direction, and where each frame segment in the sections may have a cross section profile that is elongated in the vertical direction.

Such profiles of the side segments of the frame may reduce or eliminate the effects of side winds or gusts during operation. Such winds or gusts may shift the angle of attach in the flight direction and adversely affect the stability or flight. In particular it has been found that such elongated members will result in tight tow lines which is important for not only the stability of the frame, but also the operator/pilot of the system since slag tow lines requires operational attendance and procedures to correct the slag tow lines.

According to a particular embodiment of the airborne electromagnetic survey system or a frame, the frame may have a port side and starboard side each comprising at least one section of at least one frame segment where each part side section and starboard section is essentially parallel to the flight direction, and where each frame segment in the sections has a cross section profile that is essentially elliptical with the major axis essentially oriented in the vertical direction.

According to an embodiment of the airborne electromagnetic survey system the aerodynamic profile is configured to maintain the frame substantially in a fixed operational orientation such as substantially horizontal at least at a flight speed of 140 km/h or above, preferably 150 km/h or above and more preferably 170 km/h or above.

In an embodiment the frame is configured to be towed by aircraft that is a helicopter and configured to operate at a flight speed of 100 km/h or above and so that the frame having substantially a fixed frame shape and substantially being in a fixed operational orientation.

The use embodiments as disclosed and of a frame or frame segments with aerodynamic properties as disclosed will allow for operation at higher speeds than hereto known. In particular it will be possible to perform surveys at those speeds with a helicopter rather than an airplane. This is advantageous when operating in remote areas where helicopters can land or take off. This is also advantageous in operational conditions where a helicopter has flying access contrary to aircrafts. This may be places with mountains or with infrastructure.

In an embodiment the method of geophysical prospecting is using an airborne electromagnetic survey system as disclosed and wherein the aircraft is a helicopter and the flight speed is 140 km/h or above, preferably 150 km/h or above, and more preferably 170 km/h or above.

A skilled person in the art of performing airborne electromagnetic surveys or aircraft personnel will appreciate that flight speed and apparent flow velocity during operation may be understood in terms of more detailed term and may be functions of indicators such as IAS—Indicated Air Speed, CAS—Calibrated Air Speed, TAS—True Air Speed, and GS—Ground Speed.

As such the flight speed is understood as a speed during operation.

These measures take weather and wind conditions into account. When there is no wind, the flight speed will essentially be identical to the ground speed. When there is a wind the flight speed may take the wind conditions into account as well as the flight For all practical or operational purposes the operator or pilot will be able to perform readings—primarily instrumental readings—more effectively by having the frame or system disclosed, since the stability of the frame during a variety of the circumstances will allow the pilot to focus on flying more stable with higher speed. Such additional effect has shown or will show to further enhance the quality of the airborne geophysical survey and at faster speed.

BRIEF DESCRIPTION OF DRAWINGS

Embodiments will be described in the figures, whereon.

DETAILED DESCRIPTION

Figure 1:
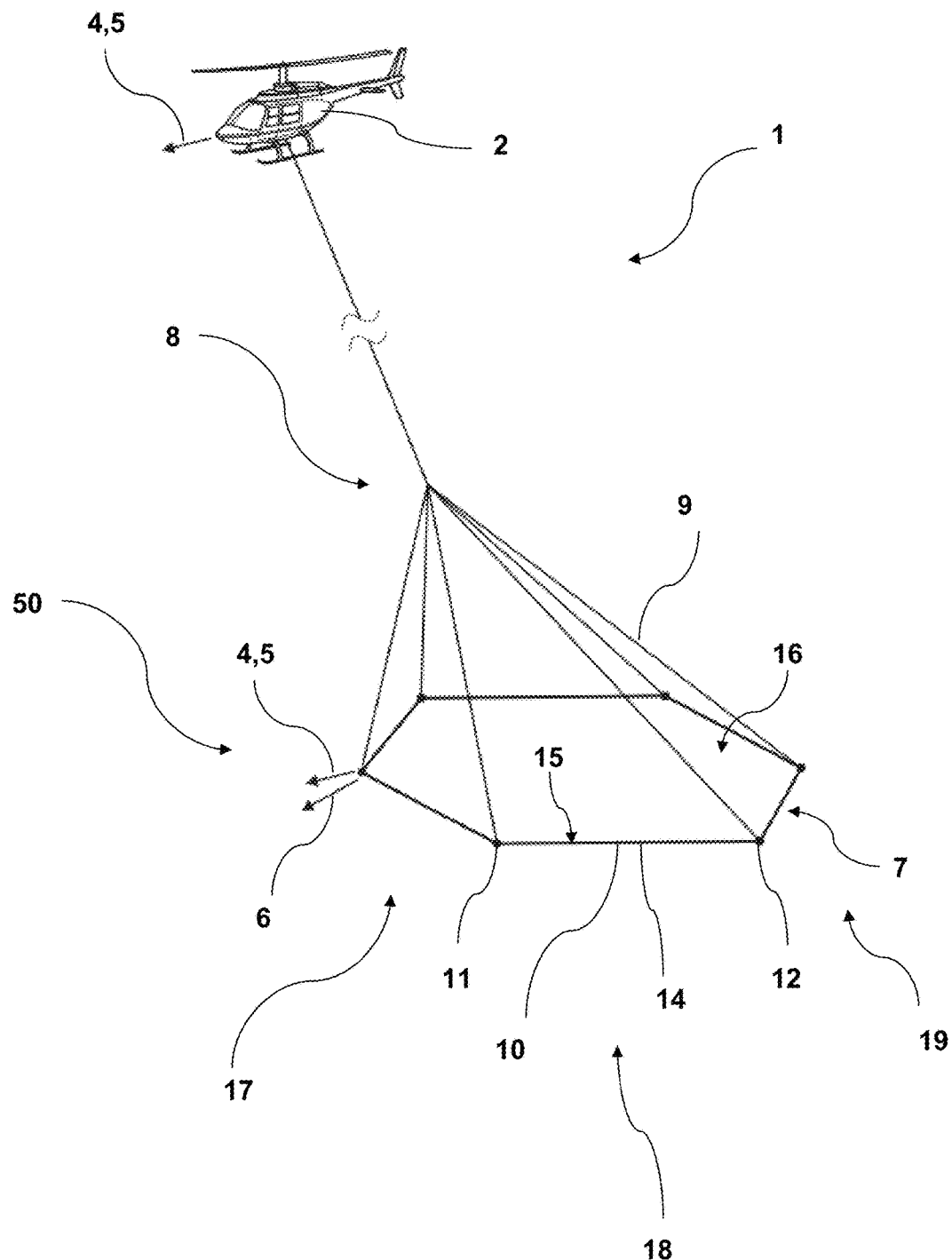
FIG. 1 illustrates an aircraft with a tow arrangement and a frame during survey operation in a flight direction.

FIG. 1 illustrates an airborne electromagnetic survey system 1 configured for geophysical prospecting. The survey system comprises an aircraft 2 such as the shown helicopter. The aircraft 2 operates in a flight direction 4 at a flight speed 5 facing specific air conditions resulting in an apparent flow velocity 6 taking wind into account of the airborne electromagnetic survey system 1. The aircraft 2 lifts a frame 7 via a tow arrangement 8, which tow arrangement 8 comprises more tow lines 9.

During operation the aircraft 2 tows the frame 7 in the flight direction 4 at the flight speed 5. A person though the frame 7 essentially experiences the apparent flow velocity 6. A person skilled in the art will appreciate differences in operational conditions varying from windless or calm to gusty conditions. In essence the frame 7 will be operated in the flight direction 4 at the flight speed 5 and experience the apparent flow velocity 6. Operating in windless conditions, and disregarding possible air streams from the aircraft 2, the apparent flow velocity 6 is identical to the flight direction 4 and the flight speed 5.

The frame 7 comprises frame segments 10, where each frame section 10 spans between a first connection 11 and a second connection 12 and is supported by a structural support 14. Each frame segment 10 may have a frame segment surface 15.

Each connection 11, 12 may be configured so that multiple frame segments 10, 10 can be connected to form the frame 7. In the shown embodiment the frame 7 is formed as a polygonal 16. Generally the frame 7 has a frame front section 17 facing the flight direction 4 and opposite that a frame tail section 19, and in between a frame middle section 18.

Figure 2:
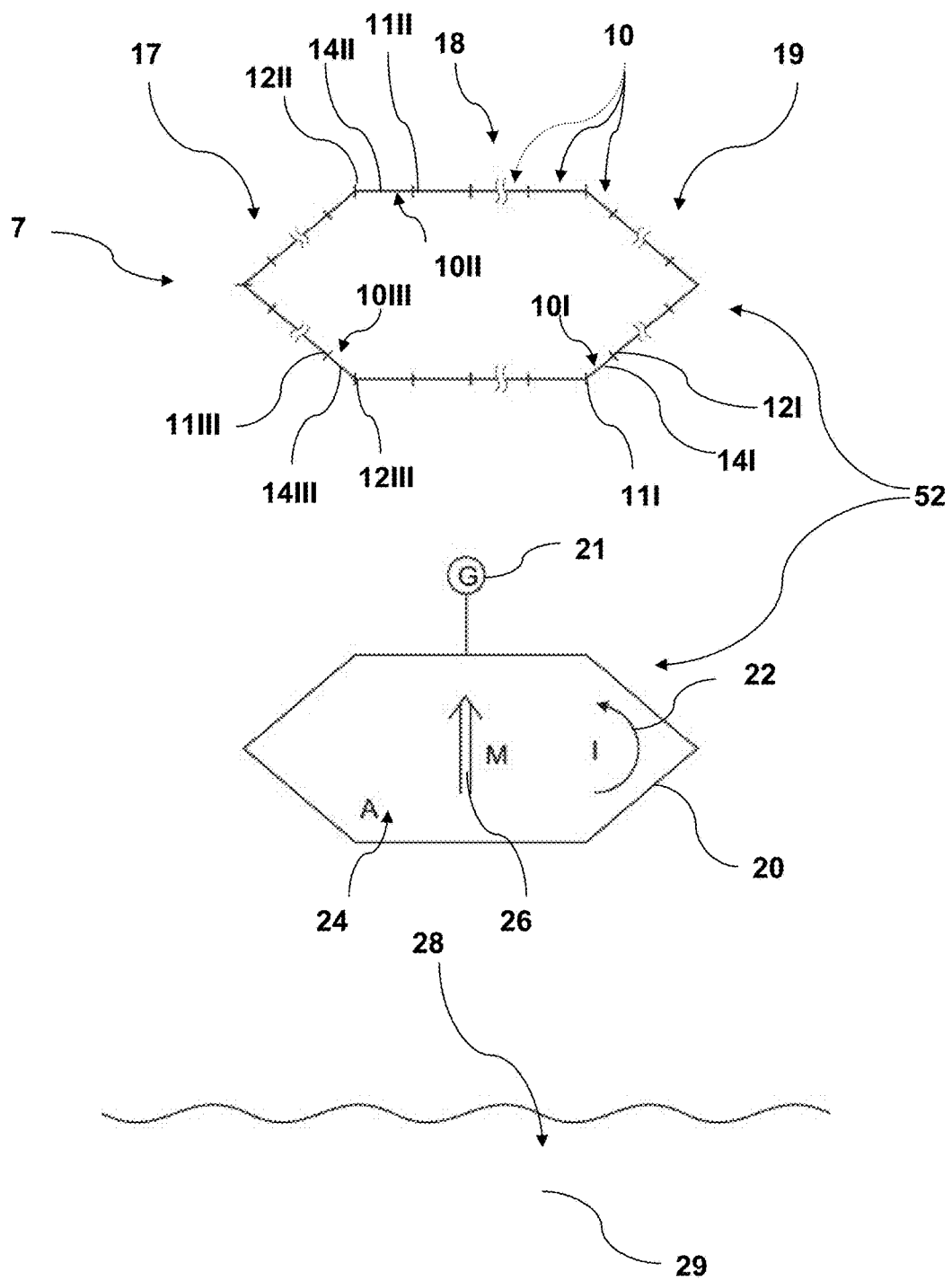
FIG. 2 illustrates a frame with frame segments and a transmitter coil arranged to transmit a magnetic moment for geophysical prospecting.

FIG. 2 illustrates a frame 7 with a frame front section 17, a frame middle section 18, and a frame tail section 19. The frame 7 is made of multiple frame segments 10. Each section 10 supports a first connection 11 and a second connection 12. One frame section 10 may end in a second connection 12, which second connection 12 is also the first connection 11I of an adjacent frame section 10' and so forth. The connections 11, . . . 12, . . . may be configured so that the frame 7 forms a particular shape. In the embodiment the shape is a polygon, specifically a hexagon.

The figure illustrates a tail section 19 with a frame segment 10I having a structural support 141 that may be tailored specifically for the frame tail section 19. Likewise the frame segment 10I may have an aerodynamic profile suitable for the tail section. The structural support 141 connects the first connection 11I and the second connection 121 tailored for the frame tail section 19 to active the desired overall form of the frame 7. Here the first connection 11I is a transition connection between the frame tail section 19 and the frame middle section 18.

Likewise the figure illustrates frame segments 10II for the frame middle section 18 and frame segments 10III for the frame front section 17 as well as first 11II, 11III and second connections 12II,12III and structural supports 14II,14III, respectively.

In one embodiment the frame segments 10 are identical. In one embodiment the structural supports 14 are identical, but the aerodynamic properties of frame segments 10 for the frame tail, middle or front sections 19, 18, 17 are different.

In an embodiment, the frame segments 10 are configured to form the frame 7 and configured to support a transmitter coil 20. The transmitter coil 20 is connected to a generator 21 generating a transmitter current 22. The transmitter coil 20 is supported by the frame 7 to span a transmitter area 24 so as to generate a magnetic moment 26 for geophysical prospecting 28 in an underground formation 29.

The frame 7 has a frame shape 52 that essentially defines the shape of the transmitter coil 20. It is understood that the transmitter coil 20 may be fixed to the frame 7 so that when the frame 7 has an essentially fixed frame shape 52 during operation, the transmitter coil 20 will also have an essentially fixed shape during operation.

A person skilled in the art will be enabled to configure the receiving system including a receiver coil using configurations disclosed in references such as, but not limited to, WO04072684.

Figure 3:
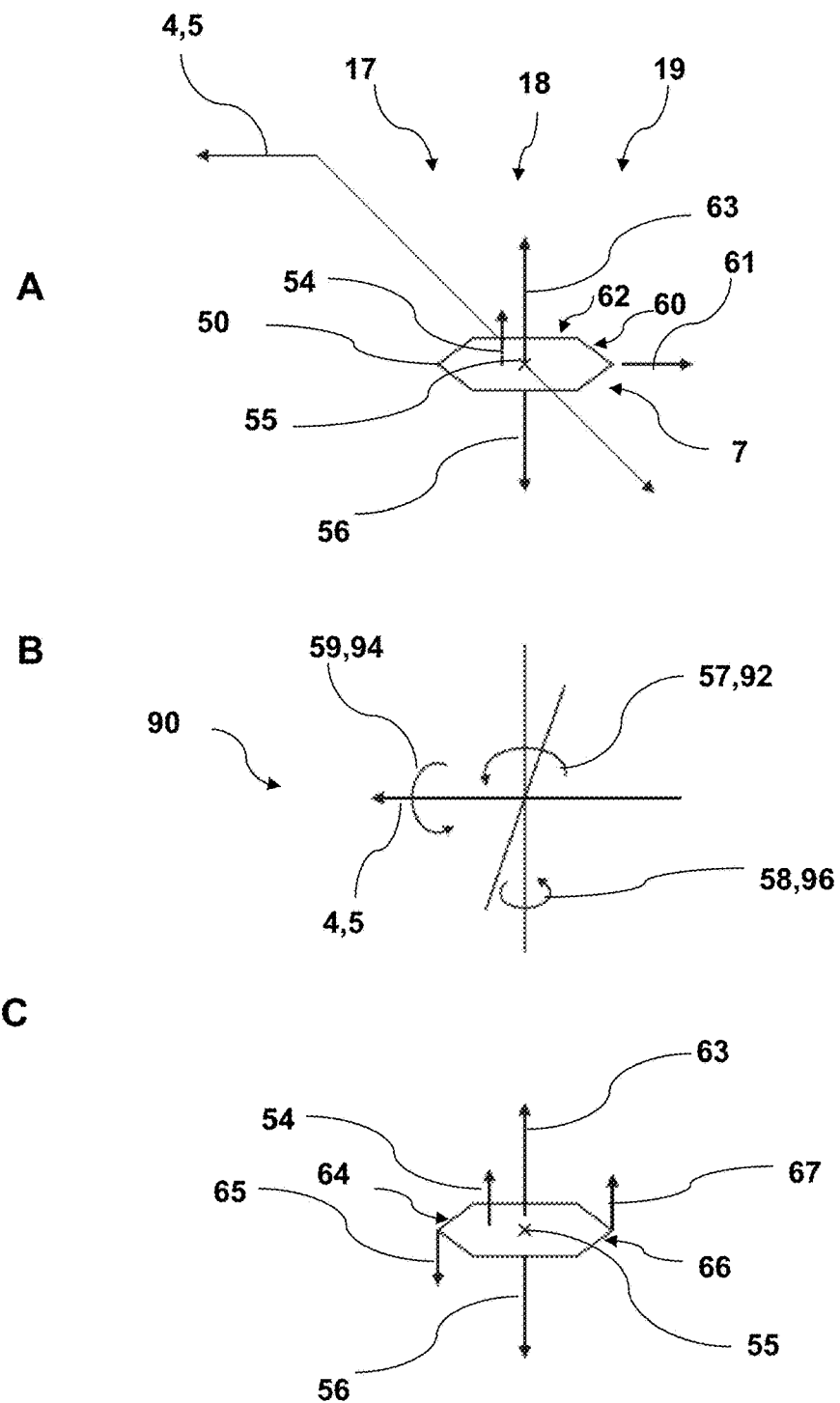
FIG. 3 illustrates forces, gravitational, lift, and drag forces, acting on a frame during survey operation in a flight direction as well as an operational orientation that can yaw, pitch, and roll.

FIG. 3 illustrates forces acting on, rotations of, and moments applied to a frame 7. In particular to the whole frame 7, and to the frame front, middle, and tail section 17, 18, 19.

FIGS. 3A and 3C illustrates a frame 7 and its orientation 54 as a normal to a plane of the span of the frame 7 as well as the relation to rotational definitions such as pitch 57, yaw 58 and roll 59 in FIG. 3B. Similarly, for each axes a force may provide a stabilising moment 90 being a pitch moment 92, a roll moment 94 and a yaw moment 96.

FIG. 3A shows a frame 7 oriented in an orientation 54, which orientation for practical purposes may be defined as the normal to the projection of the transmitter coil resulting in the largest transmitter area A seen by the underground. In practice the frame 7 will be extending essentially in a plane and the orientation 54 is given in a natural way. Furthermore, the frame 7 with a certain weight will have a centre of gravity 55 and experience a gravitational force 56.

When the frame 7 is towed in a flight direction 5 at a flight velocity 4, the frame 7 having an aerodynamic profile 50 with a drag coefficient 60 resulting in the frame 7 experiencing a drag force 61 acting in the opposite direction of the flight direction 5 (ideally and disregarding the winds) when the frame 7 is towed by an aircraft. Similarly the aerodynamic profile 50 is configured with a lift coefficient 62 that may result in the frame experiencing a lift force 63 acting in the opposite direction of the gravitational force 56 when the frame 7 is towed by an aircraft.

The aerodynamic profile 50 of the frame 7 is configured to enhance the aerodynamic properties of the frame 7 so that when towed by the aircraft 2 via the tow arrangement 8 and during survey operation in the flight direction 4 the frame 7 is substantially in a fixed operational orientation 54.

FIG. 3C illustrates that the front section 17 may be configured with an aerodynamic profile 50 providing a front lift coefficient 64 resulting in a front lift force 65 during operation. The front lift force 65 is here shown to act downwardly as a corrective force. This front lift force 65 contributes to stabilising the orientation of the front frame section 17 and/or the frame 7. Likewise the tail section 19 may be configured with an aerodynamic profile 50 providing a tail lift coefficient 66 resulting in a tail lift force 67 during operation. This tail lift force 67 contributes to stabilising the orientation of the tail section 19 and/or the frame 7 during operation.

A person skilled in the art will appreciate the influence of the tow arrangement 8 in terms of weight and take such shift of centre of gravity 55 into account.

Figure 4:
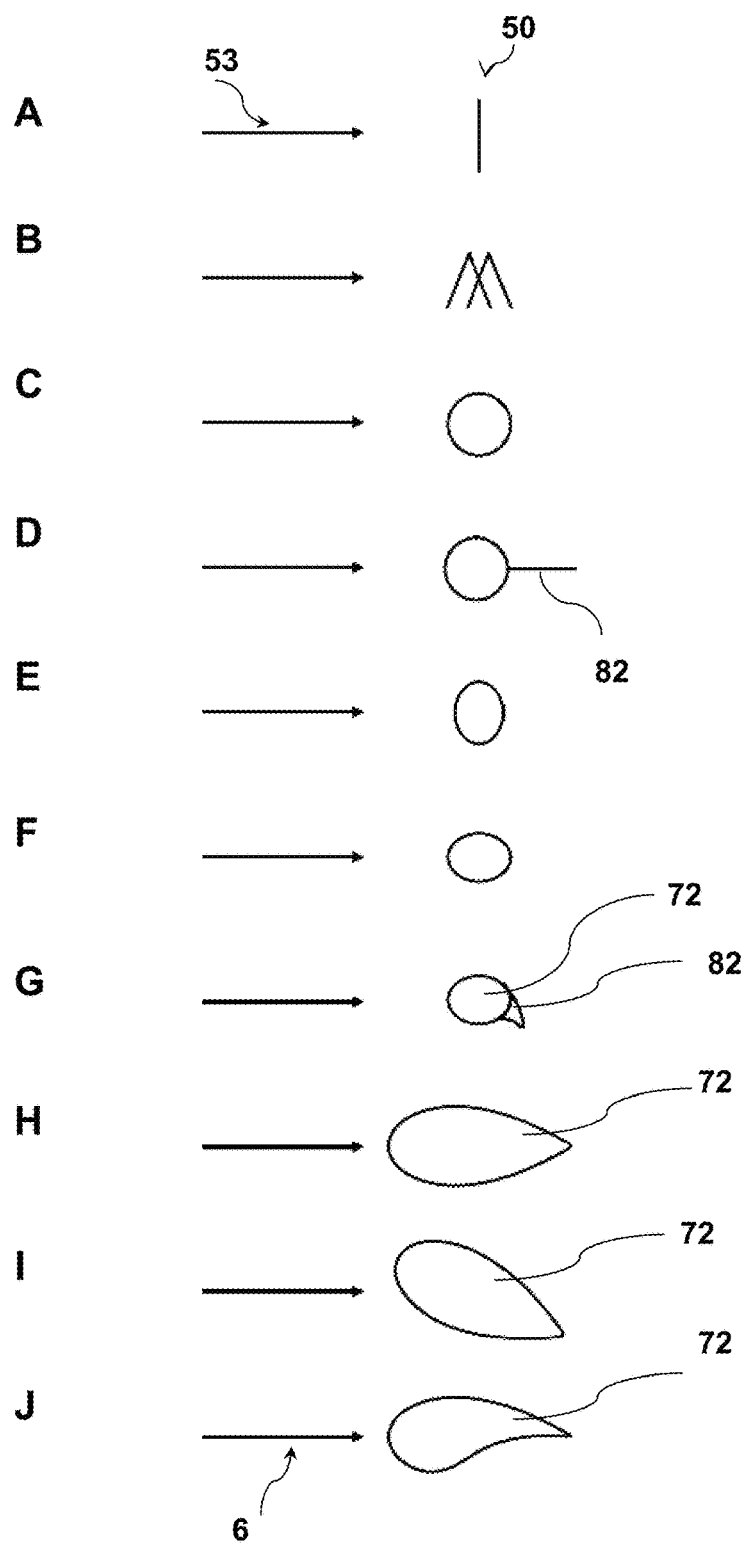
FIG. 4 illustrates various aerodynamic profiles of cross sections of a frame section.

FIG. 4 illustrates cross sections of a variety of frame segments with different cross sections or profiles, but the same cross section seen in the direction of angle of attack 53 as being the direction that the apparent flow velocity 6 attacks the profile.

A is a simple beam structure. B is a grid or lattice structure. C is a circular profile. A, B, and C constitute part of prior art.

D is a circular profile with a spoiler 82 attached to reduce drag. E is an elliptic profile with an aerodynamic profile with increased drag compared to C, but increased strength in the vertical direction and thus with combined improved properties compared to C. F is an elliptic profile with an aerodynamic profile with reduced drag compared to C, and improved stiffness in the horizontal plane. G is an elliptic-type profile with a spoiler 82 resulting in an airfoil 72 type aerodynamic profile. H is a symmetrical airfoil 72 profile without intrinsic lift properties due the symmetries in lift properties of the suction side and the pressure side; for a direct angle of attack I is an asymmetrical airfoil 72 with intrinsic lift properties due the differences in lift properties of the suction side 77 and the pressure side; for a direct angle of attack. J is an asymmetrical airfoil 72 profile with an intrinsic pressure side and suction side resulting in intrinsic lift, for a direct angle of attack.

Figure 5:
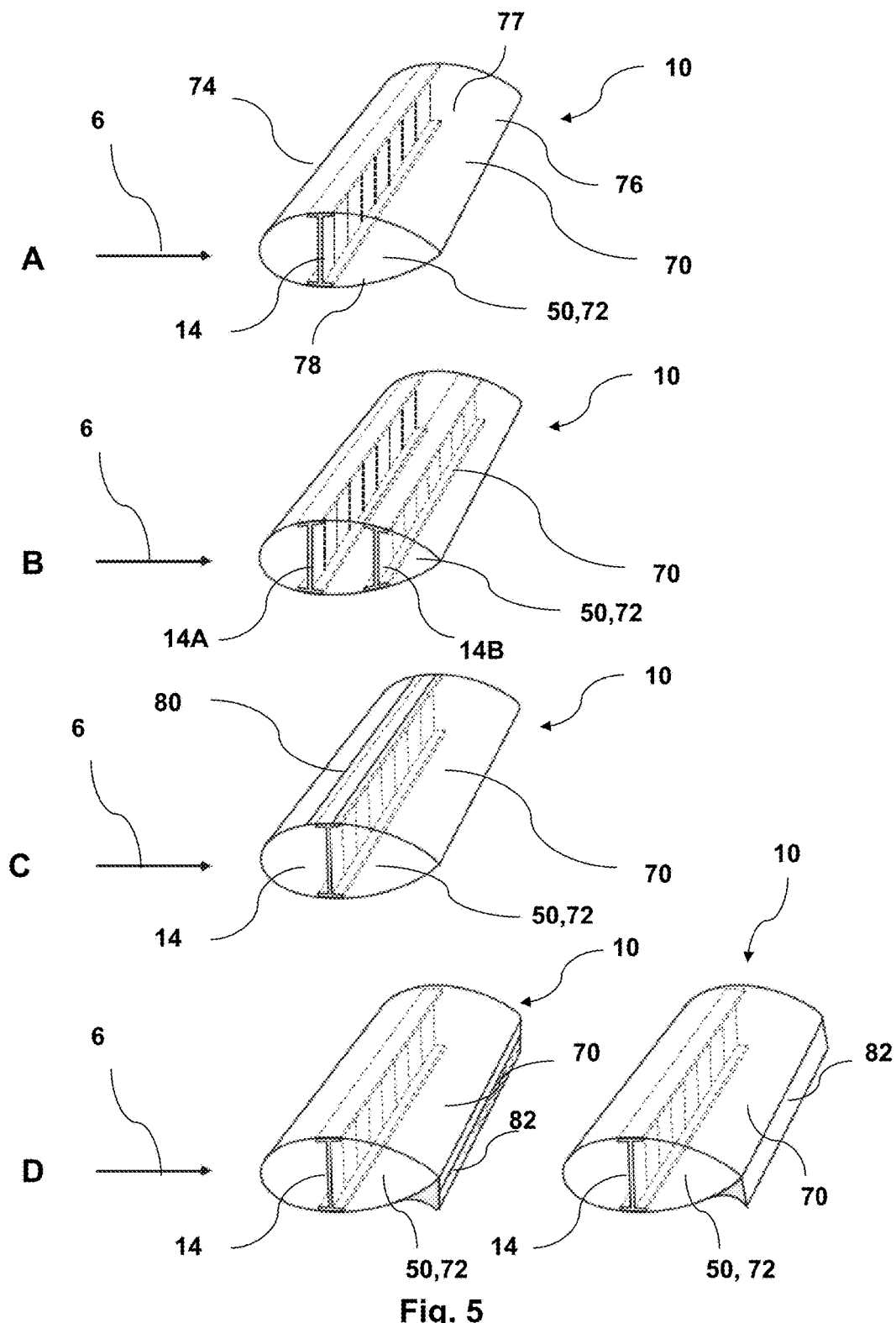
FIG. 5 illustrates embodiments of parts of a frame section having an airfoil aerodynamic profile and is structurally supported by a beam with an I-profile.

FIG. 5 illustrates a series of embodiments A, B, C, and D of frame segments 10 or parts of frame segments 10 in an apparent flow velocity 6 equivalent to an angle of attack 53 (not shown).

FIG. 5A illustrates a frame segment 10 with a structural support 14 enclosed by a frame segment surface 70 forming an aerodynamic profile 50. In this embodiment the aerodynamic profile 50 may be considered as an airfoil 72.

The supporting structure 14 may be a beam spanning the frame segment 10. The beam or support structure 14 may have an I-profile as indicated. The I-profile may support the shell or aerodynamic surface 70 at the widest location, but the I-profile may also be shifted slightly to absorb forces.

The aerodynamic surface 70 may be defined by a shell structure also providing structural or stiffness to the frame segment 10. In an embodiment the shell structure in combination with a support structure such as the I-profile beam may provide a sufficiently rigid frame segment 10 to be part of a frame for aerodynamic electromagnetic prospecting.

Figure A also indicates a leading edge 74, a trailing edge 76 of a frame segment 10. Also indicated are a suction side 77 and a pressure side 78. The profile indicated may generally be considered the shape of an airfoil 72. The definitions are readily recognised in other illustrations.

In B two I-profiles or an II-profile construction is illustrated. Such construction provides further stiffness and rigidity to the frame segment 10. Here a first structural element 14A having an I-profile and a second structural element 14B are illustrated. This arrangement also provides a space between the Is that is particularly suited for a transmitter coil due to its protective character.

Figure C illustrates a further addition of a vortex generator 80, here implemented as a strip that is added on the suction side.

In another embodiment the implemented strip may configured to generate a layer of micro turbulence that will extend towards the trailing edge 78 and reduce drag.

Figure D indicates additions of a spoiler 82 to the frame segment 10 or otherwise the provision of a spoiler 82. Alternatively a part of aerodynamic profile being formed as an addition with the functioning of a spoiler 82.

For aerodynamic properties additions to a airfoil 72 profile, the addition maybe something mounted on, embedded into or added onto the surface or alternatively the surface may be formed or locally adopted to have the features and functions of an otherwise addition. As such the spoiler 82 shown on the frame segment may be either mounted on or locally formed as part of the surface.

Figure 6:
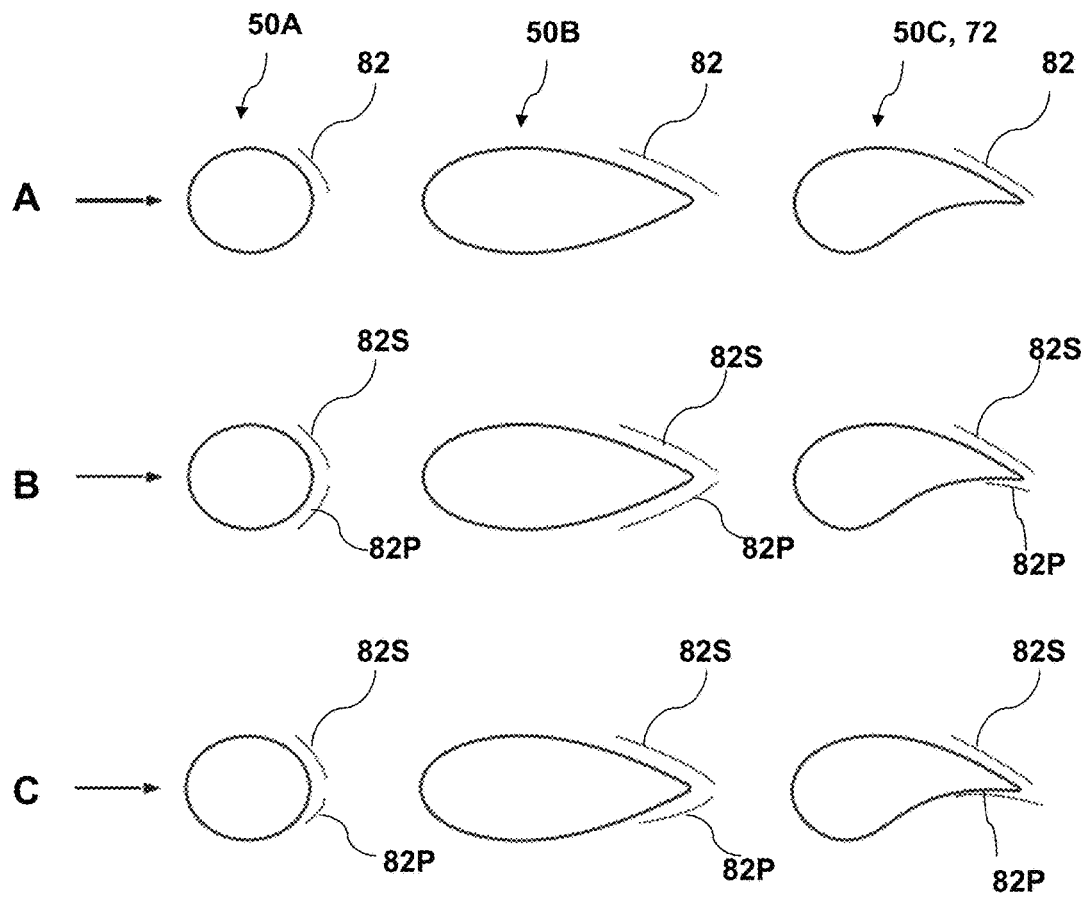
FIG. 6 illustrates various spoiler arrangements in connection with aerodynamic profiles.

FIG. 6 illustrates a variety of spoiler arrangements for aerodynamic profiles 50 in connection with an aerodynamic profile with a circular cross section 50, a symmetrical airfoil 50B, and a airfoil with inherent pressure side and suction side or inherent lift profile 50C.

According to an embodiment, a spoiler 82 may be added on one side of an aerodynamic profile 50A, 50B, or 50C thus providing the circular profile 50A with enhanced aerodynamic properties such as reducing the drag relatively to not having the spoiler 82. Likewise for the symmetrical airfoil 72 profile 50B and the inherent lift profile 50C. The placements of the spoilers in figure A mainly result in reduced drag. It is, however, appreciated that such spoiler arrangement also will contribute to lift.

FIG. 6B illustrates "symmetrical" arrangements of spoilers 82 both on the suction side 82S and on the pressure side 82. The effect of those placements is to further reduce the drag. A further effect may be to adjust the contribution to lift and even for certain angles of attack to reduce if not eliminate lift.

For the airfoil 50C profile the suction side spoiler 82S is different in shape or not symmetrical in shape since it accounts for the inherent difference of the suction side and the pressure side shapes. The spoilers aim to reduce drag without altering the lift properties—at least one angle of attack.

FIG. 6C illustrates "asymmetrical" arrangements of spoilers 82 both on the suction side 82S and on the pressure side 82. The effect of those placement or arrangement is that they may at least to a degree maintain lift properties whilst reducing drag. The arrangement may also provide lift to the aerodynamic profiles.

In all embodiments a person skilled in the art may have to perform some experimentation to obtain the desired effects outlined.

Figure 7:
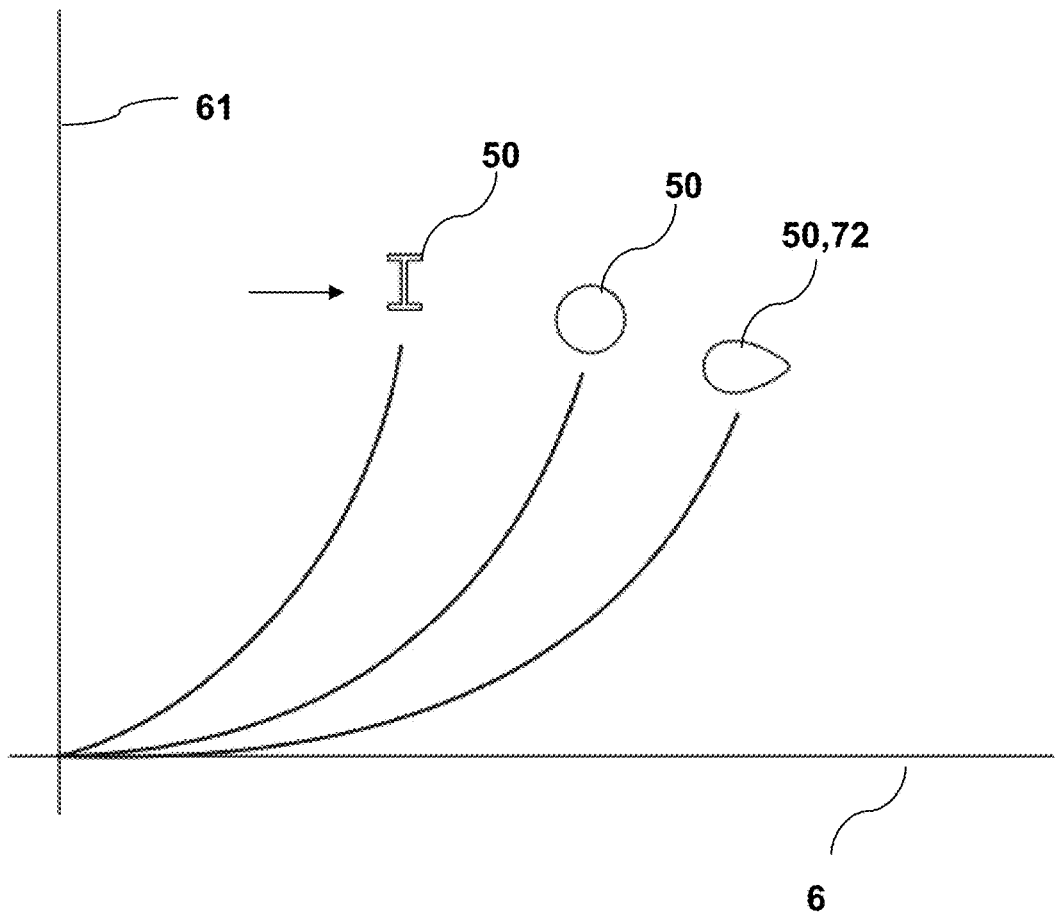
FIG. 7 illustrates the drag force as a function of air or apparent flow velocity for a beam with an I-profile, a tube with circular profile, and a frame segment with an airfoil aerodynamic profile.

FIG. 7 illustrates drag forces 61 as a function of apparent flow velocity 6 for various aerodynamic profiles 50 having a similar cross section as seen in the flow direction and being those of a frame segment formed as beam having I-profile alone, formed with a circular cross section, and formed as an airfoil 72. The advantageous effect on drag from those beyond circular cross sections is seen. Using a profile formed as an airfoil 72 is further advantageous. Overall for the same carrier forces available from the aircraft, the reductions in drag forces compared to those of a circular profile and in particular for airfoil shapes increase the operational speed or prolong the operational range.

Figure 8:
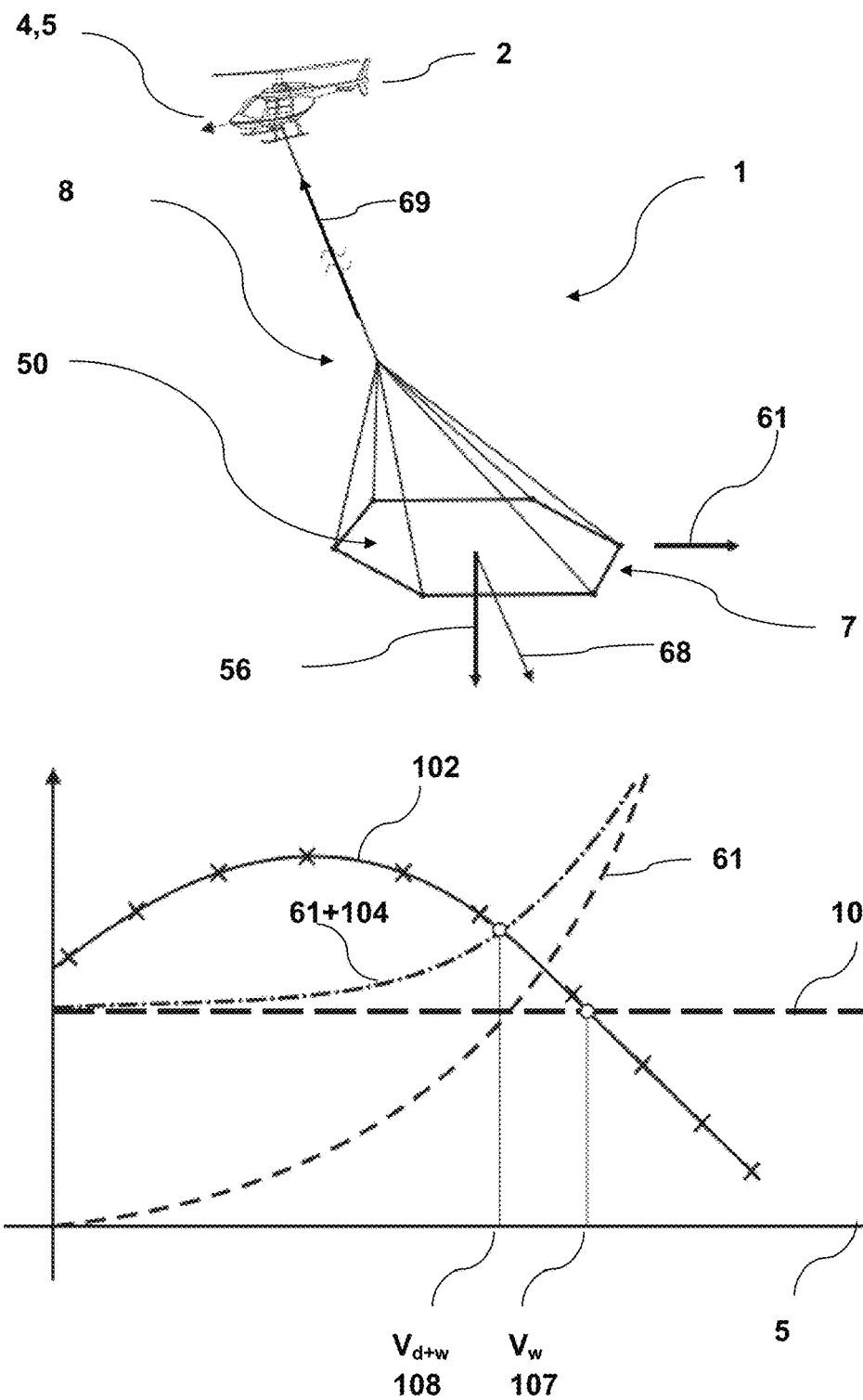
FIG. 8 illustrates forces on a frame with reduced drag during operation using a helicopter.

FIG. 8 illustrates an airborne electromagnetic survey system 1 where the aircraft 2 is a helicopter operating in the flight direction 4 with a flight speed 5. The helicopter tows a frame 7 in a tow arrangement 8. The frame 7 has an aerodynamic profile 50 with advantageous drag properties due to configuration as disclosed with respect to improving drag properties. The frame 7 results in a drag force 61 and the weight in a gravitational force 56. The combined forces 68 are compensated or balanced by a carrier force 69. For simplicity the forces from the tow arrangement 7 are not included here, but naturally it will contribute to weight and drag as will other system components such as generator, receiver coil and data logging equipment. From an operational point of view, the system contributes to a system weight force 104 that is constant for a particular configuration/operation i.e. independent of operational speed 5.

The effects and advantages of configuring frame segments or a frame with aerodynamic properties can be understood when considering an aircraft envelope, and in particular carrier envelope 102 (as a function of operational speed 5 or apparent flow velocity 6) of a helicopter. The carrier envelope 102 is what the helicopter can carry as a function of its operational speed 5. Disregarding drag forces, the figure illustrates the maximum operational speed 5 $V_w$ 107 that the helicopter can operate for a given system weight 104. $V_w$ 107 is defined as where the carrier envelope 102 crosses the system weight force 104. Taking drag forces 61 into account it is clear that the operational speed 5 is reduced to $V_{w+d}$ 108 (weight plus drag). $V_{w+d}$ 108 is defined as where the carrier envelope crosses the system weight force 104 plus the drag force 61. The benefits from reducing the drag forces 61, i.e. the drag force 61 curve is lowered (or shifted to the right), is that the operational speed 5 $V_{w+d}$ 108 increases. Hereto the operational speed 5 would have been increased by providing a more powerful or a different aircraft. Another solution could be to use airplane instead of a helicopter, but that would require complex modifications of the whole prospecting system.

Figure 9:
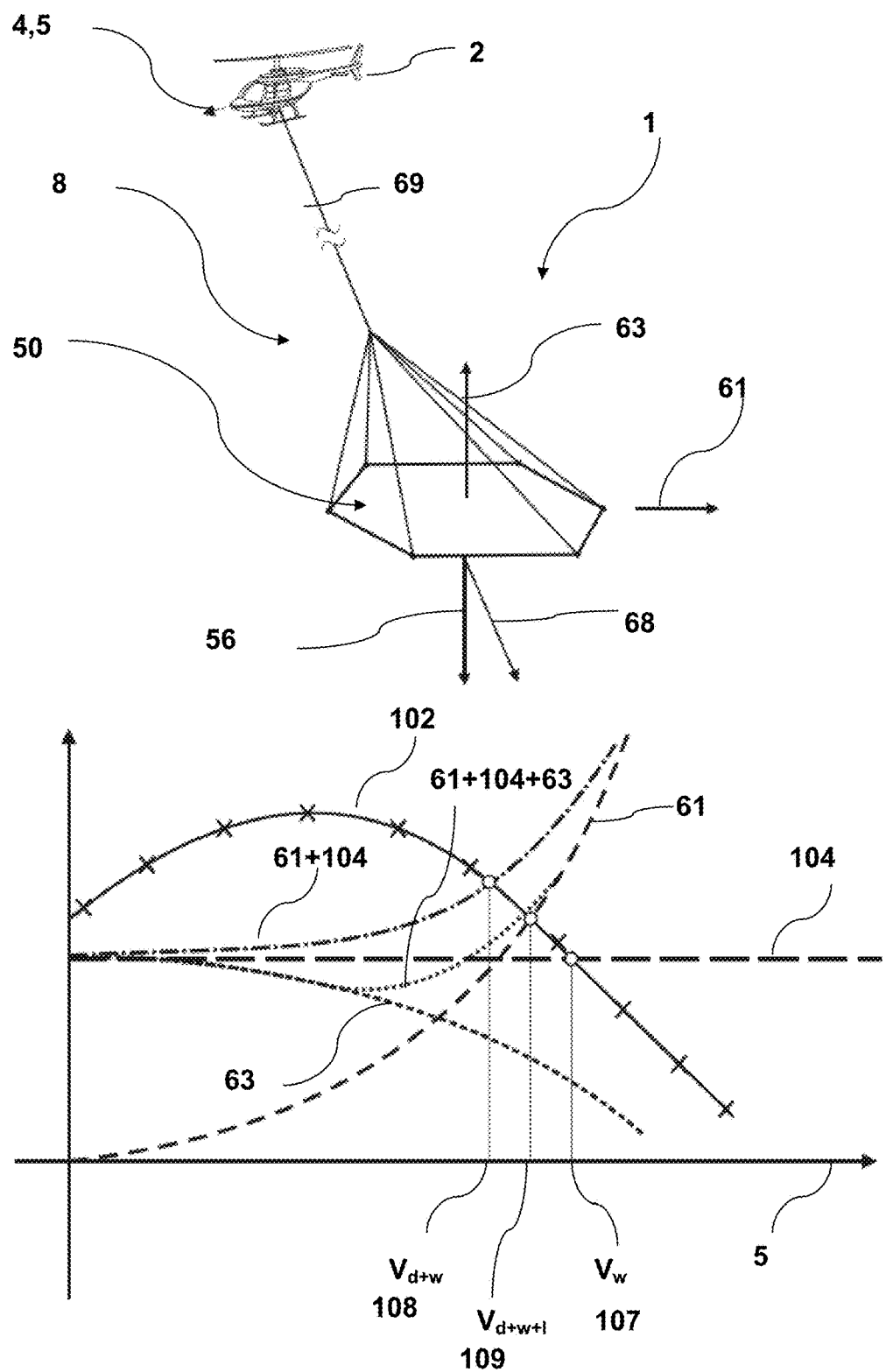
FIG. 9 illustrates forces on a frame providing lift during operation using a helicopter.

In continuation of FIG. 8, FIG. 9 illustrates the effect of a frame 7 or one or more frame segments with an aerodynamic profile 50 with lift forces 63.

The carrier envelope 102 tops and decreases for increasing flight speed 5. The system weight forces 104 are constant for flight or operation speed 5. Drag forces 63 of a particular frame increase as a function of flight speed 5 for a particular aerodynamic profile 50 with reduced drag. In this embodiment the aerodynamic profile 50 is also configured with lift and for illustrative purpose the lift profile of the lift forces 63 decrease (increase upwardly) for increasing flight speed 5. The combined forces of system weight 104, drag 61 and lift 63 (61+104+63) crosses the carrier envelope 102 and defines a operational max speed $V_{d+w+l}$ 109 that is further above the operational speed $V_{d+w}$ 108 of an aerodynamic profile only configured with drag.

A frame 7 may be configured with a lift profile that has a maximum lift (it may even peak) force 63 for a flight speed 5 less than $V_w$ 107.

Figure 10:
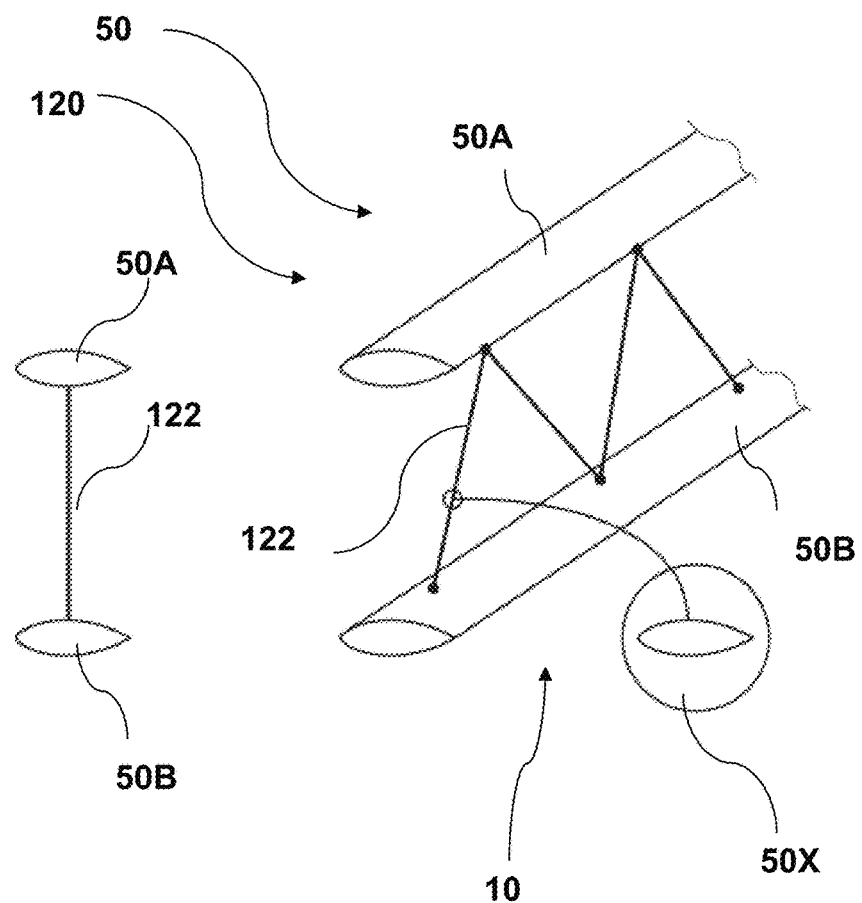
FIG. 10 illustrates features of lattice or grid structure, here formed as an I-profile where each structural element having an aerodynamic profile.

FIG. 10 illustrates alternative embodiments of part of a frame segment 10. In this embodiment the frame segment 10 is configured as a grid structure 10 or a lattice structure. An element may be formed as a shell structure with an aerodynamic profile 50A, here formed as an airfoil. Another similar element may be formed as a shell structure with a similar aerodynamic profile 50B here also formed as an airfoil.

The two shell structures may be connected by a grid support 122 and arranged relative each other to provide a combined aerodynamic profile 50. In this particular embodiment the two shell structures are arranged on top of each other forming an I-profile. Such grid structure 120 has less drag and sufficient stiffness or rigidity compared to a circular tube with the same cross section and/or weight. The grid support may even be formed with an aerodynamic profile 50X.

Figure 11:
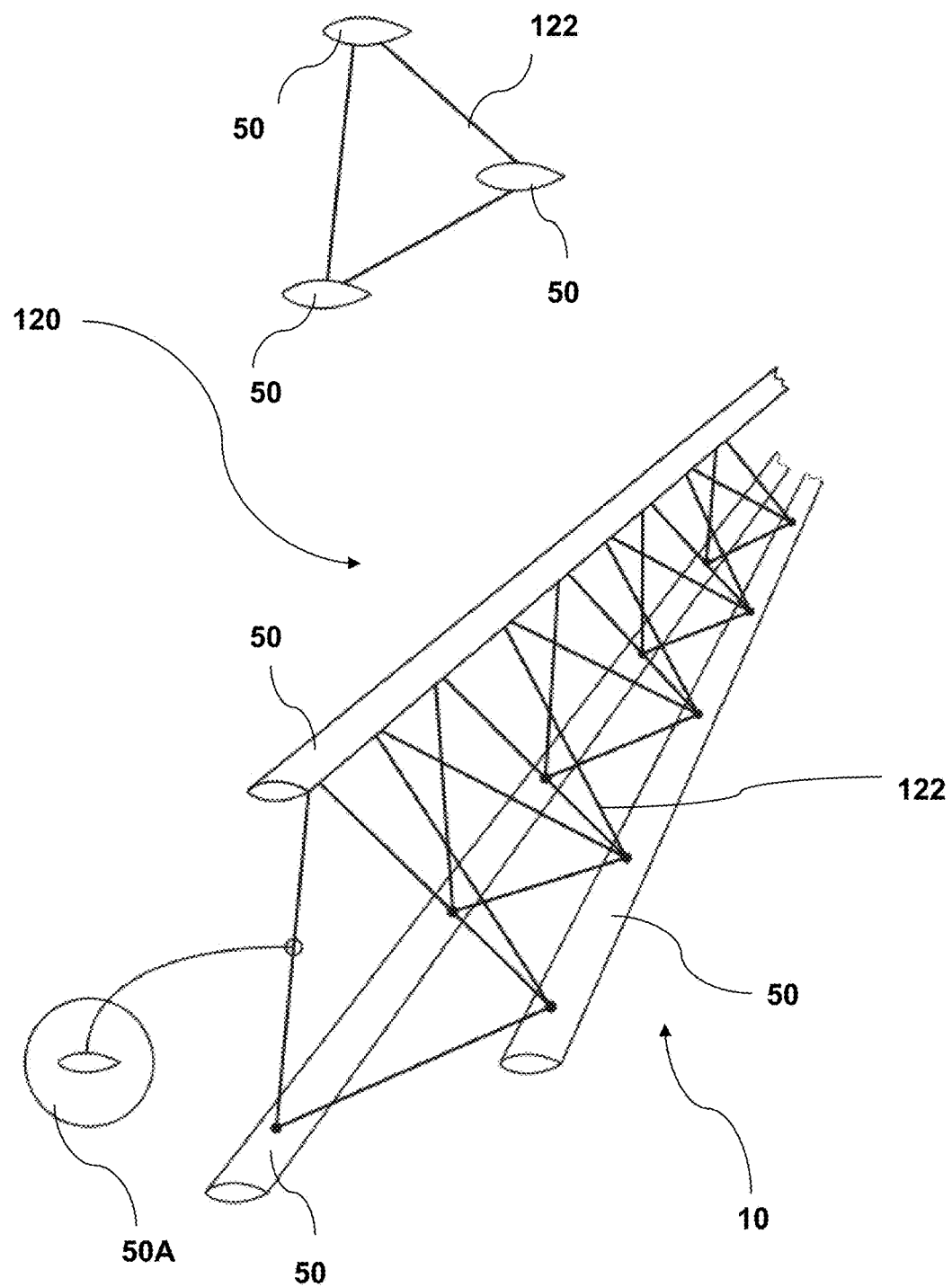
FIG. 11 illustrates features of a lattice or grid structure, here formed as a triangular configuration of structural elements each having an aerodynamic profile.

FIG. 11 illustrates an embodiment of a grid structure 120 comprising three identical shell structures with identical aerodynamic profiles 50 arranged in a triangular arrangement each shell structure having its leading edge in the same direction. Such arrangement results in an even more rigid structure at the cost of a relative small increase in drag forces caused by the additional grid support 122 necessary.

Figure 12:
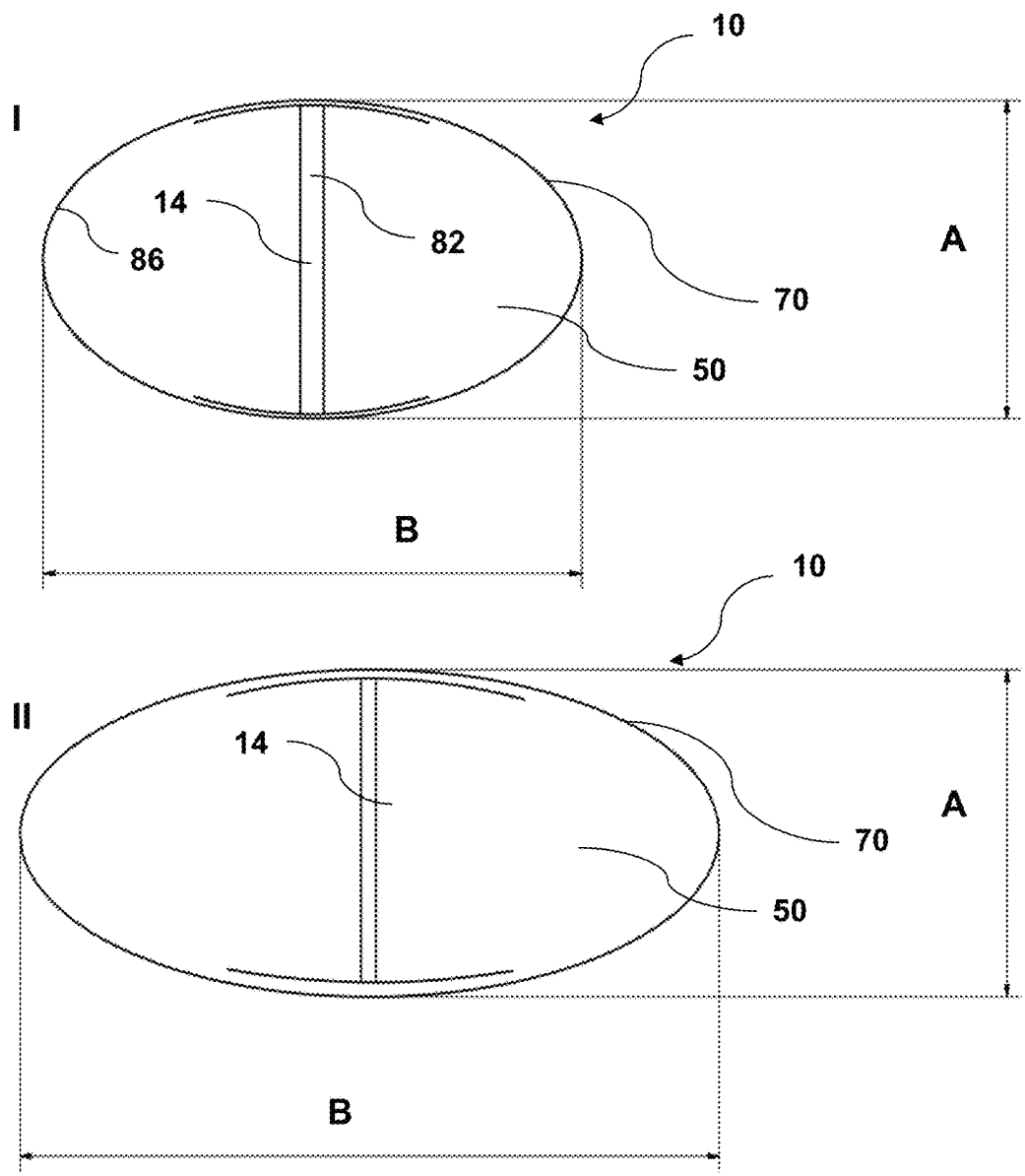
FIG. 12 illustrates aerodynamic profiles formed with a structural element with an I-profile.

FIG. 12 shows particular I and II embodiments of frame segments 10. Both frame segments 10 have aerodynamic profiles 50 due to a frame segment surface 70 that are essentially elliptic-like airfoils with optimised (low) drag coefficients. The frame segments are characterised by aspects A/B-ratios, where A for a frame may be in the order of 136 mm and B in the order of 230 mm.

To even further reduce drag, another aspect-ratio may be advantageous. For the II profile A may be in the order of 136 mm and B in the order of 325 mm.

In both embodiments a structural support 14 with an I-profile is used to further support the structure. The support structure 14 may be a beam with the particular I-profile.

The frame section illustrated may be a shell type structure 86 forming the frame segment surface 70. The interior may be filled or at least partially filled with foam.

Alternative embodiments may be a foam structure 87 (not shown) or a sheet structure 88 (not shown). In an embodiment a foam structure 87 is achieved by casting foam to form the desired profile and a sheet layer may be added to form a sheet structure 88. In an embodiment a grid structure may be formed and covered by a sheet thus forming a sheet structure 88.

Figure 13:
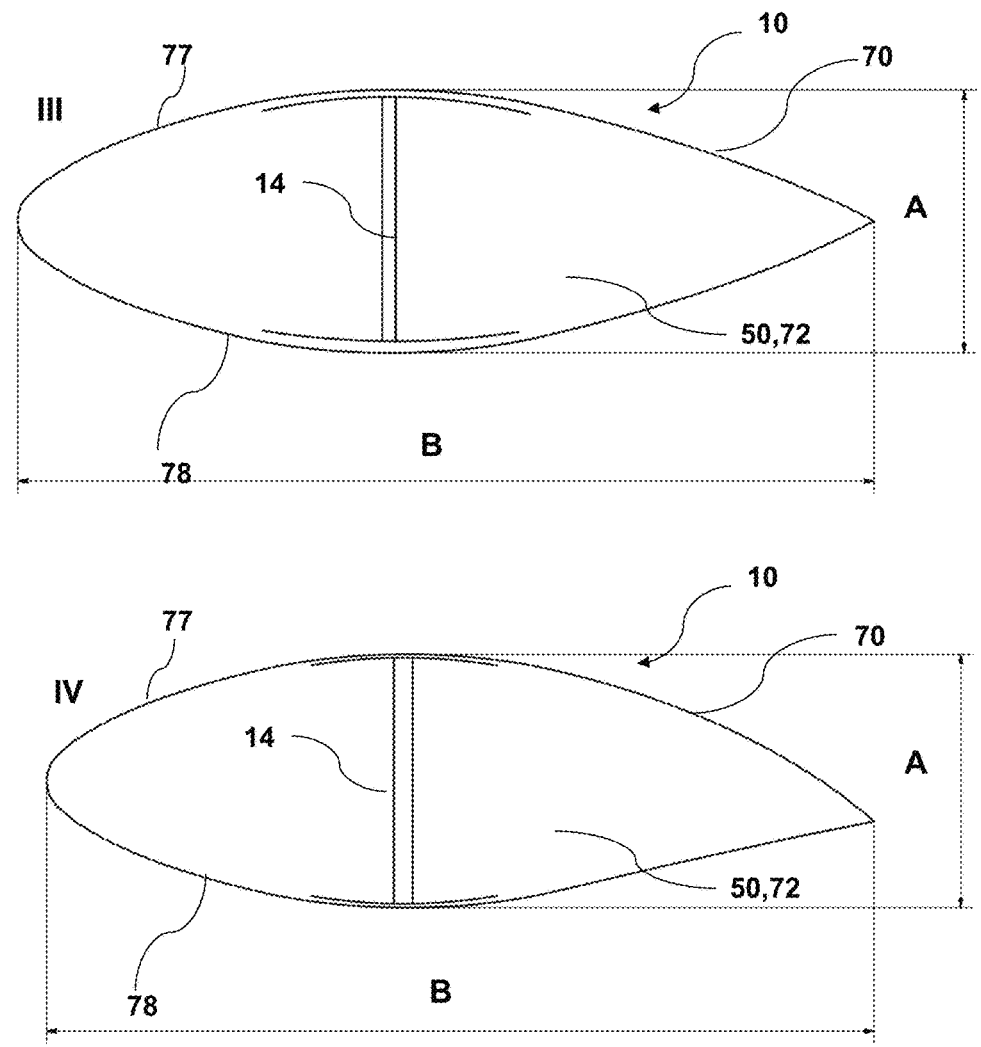
FIG. 13 illustrates aerodynamic profiles formed as airfoil, with a pressure side and a suction side.

FIG. 13 shows particular III and IV embodiments of frame segments 10. Both frame segments have aerodynamic profiles due to a frame segment surface 70. Profile III is symmetric airfoil 72 with improved drag properties compared to say profile IV. The profile does not have an intrinsic suction side 77 or pressure side 78 for an angle of attack along the cord of the profile, but for a different angle of attack, the profile will lift. Profile III is also characterised by aspects A/B-ratios where A for a frame may be in the order of 136 mm and B in the order of 443 mm.

The actual shape is seen from the figure. Similar profiles may result from this as a starting point.

Profile IV has an aerodynamic profile 50 as an airfoil 72 with intrinsic suction side 77 and pressure side 78. Thus the profile has lift for an angle of attack directly on the leading edge. The profile may have larger drag than profile III, but has higher lift than profile III.

A may be in the order of 136 mm and B may be in the order of 443 mm. The actual shape is seen from the figure, and similar profiles may result from this starting point.

Figure 14:
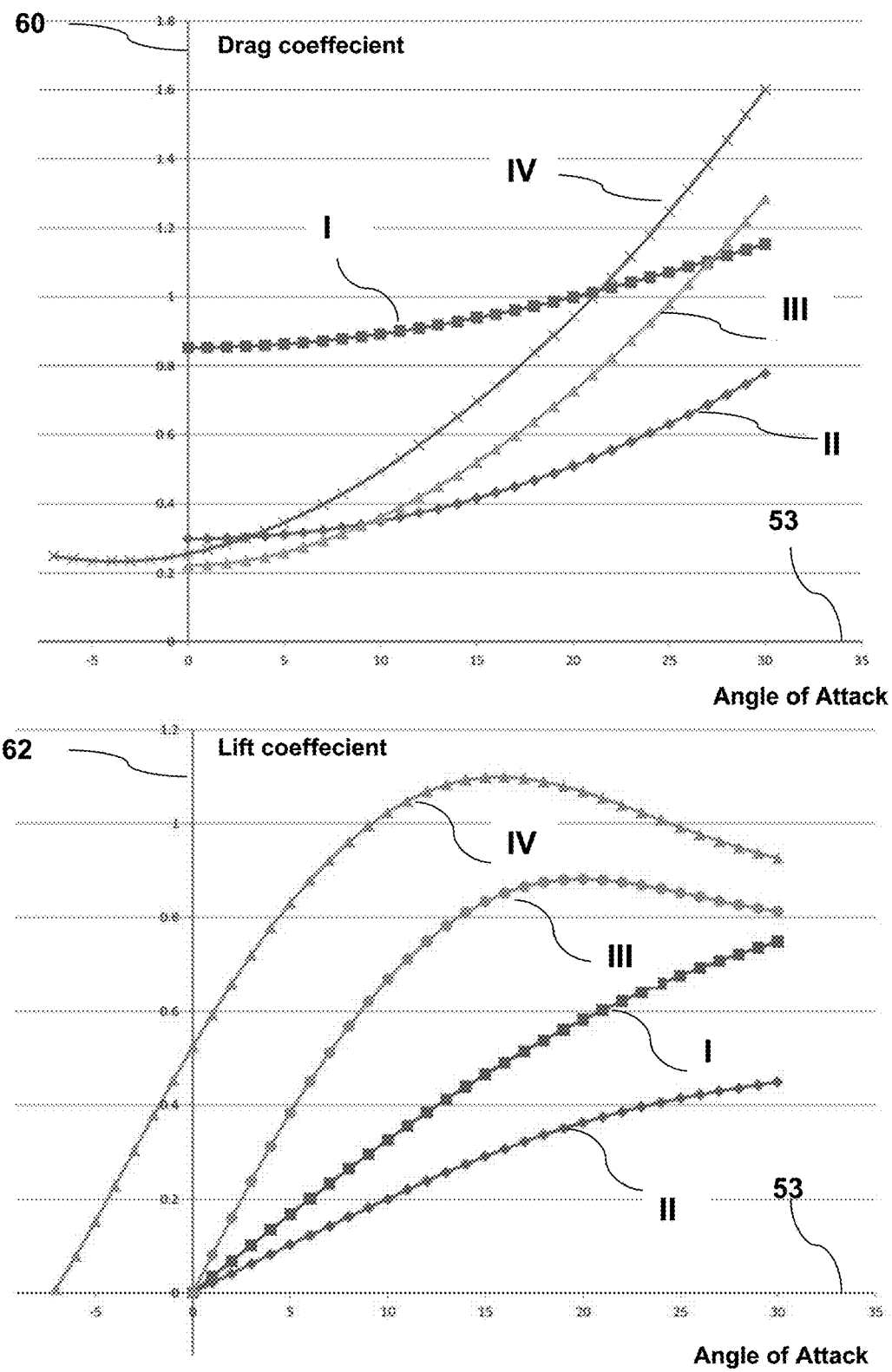
FIG. 14 illustrates estimates of drag coefficients and lift coefficients of the aerodynamic profiles from FIGS. 12 and 13.

The frame segments 10 from FIG. 12 or 14 or similar frame segments may be connected and connected rigidly to form a frame 7 that is essentially rigid and has aerodynamic properties with reduced drag. The structural element may also be a composite material or even a grid structure.

The space may be filled with foam to further strengthen the frame segment and to protect equipment by encapsulation.

FIG. 14 summarises estimates of drag coefficients 60 and lift coefficients 62 of the actual profiles I, II, III and IV from FIGS. 12 and 13.

Each profile may be a shell structure, where the shell is made of a composite type material. The supporting element 14 has an I-shape profile and may also be of composite type material. Arranging frame segments with such aerodynamic profiles in a frame with a hexagon shape has shown to be operable to speeds up to 170 km/h towed by a helicopter and to maintain an essentially fixed shape and fixed operational operation.

It should be noted that as used in this application, the term "substantially" may refer to a variation of a feature that is less than a certain percentage, such as less than 30%, less than 20%, less than 10%, less than 5%, less than 2%, less than 1%, less than 0.5%, etc. For example, a substantially fixed operation orientation may refer to an orientation (with respect to some arbitrary reference) that does not vary by more than 30%, 20%, 10%, 5%, 2%, 1%, or 0.5%, etc. As another example, a substantially fixed frame shape may refer to a feature (e.g., a profile, angle, etc.) of the frame shape that does not vary by more than 30%, 20%, 10%, 5%, 2%, 1%, or 0.5%, etc.

| Item | No |
|---|---|
| Airborne electromagnetic survey system | 1 |
| Aircraft | 2 |
| Flight direction | 4 |
| Flight speed | 5 |
| Apparent flow velocity | 6 |
| Frame | 7 |
| Tow arrangement | 8 |
| Tow line | 9 |
| Frame segment | 10 |
| First connection | 11 |
| Second connection | 12 |
| Structural support | 14 |
| Frame segment surface | 15 |
| Polygonal | 16 |
| Frame front section | 17 |
| Frame middle section | 18 |
| Frame tail section | 19 |
| Transmitter coil | 20 |
| Generator | 21 |
| Transmitter current | 22 |
| Transmitter area | 24 |
| Magnetic moment | 26 |
| Geophysical prospecting | 28 |
| Underground formation | 29 |
| Aerodynamic profile | 50 |
| Frame shape | 52 |
| Angle of attack | 53 |
| Operational orientation | 54 |
| Centre of gravity | 55 |
| Gravitational force | 56 |
| Pitch | 57 |
| Yaw | 58 |
| Roll | 59 |
| Drag coefficient | 60 |
| Drag force | 61 |
| Lift coefficient | 62 |
| Lift force | 63 |
| Front lift coefficient | 64 |
| Front lift force | 65 |
| Tail lift coefficient | 66 |
| Tail lift force | 67 |
| Combined forces | 68 |
| Carrier forces | 69 |
| Frame segment surface | 70 |
| Airfoil | 72 |
| Leading edge | 74 |
| Trailing edge | 76 |
| Suction side | 77 |
| Pressure side | 78 |
| Vortex generator | 80 |
| Spoiler | 82 |
| Composite material | 84 |
| Beam | 85 |

| Item | No |
|---|---|
| Shell structure | 86 |
| Foam structure | 87 |
| Sheet structure | 88 |
| Stabilising moment | 90 |
| Pitch moment | 92 |
| Roll moment | 94 |
| Yaw moment | 96 |
| Aircraft/Carrier Envelope | 102 |
| System Weight Force | 104 |
| $V_w$ | 107 |
| $V_{w+d}$ | 108 |
| $V_{w+d+l}$ | 109 |
| Grid structure | 120 |
| Grid support | 122 |

With reference to the feature list, the application discloses embodiments and combinations of embodiments from the following items:

Item 1. Airborne electromagnetic survey system (1) configured for geophysical prospecting comprising an aircraft (2) configured to lift and tow via a tow arrangement (8) during survey operation in air in a flight direction (4) and with a flight speed (5), a frame (7) with a frame front section (17) in the flight direction (4) and opposite a frame tail section (19) configured to be lifted and towed by the aircraft (2) via the tow arrangement (8) and to support a transmitter coil (20) configured to transmit an magnetic moment (26) for geophysical prospecting (28), which frame (7) comprises multiple frame segments (10, 10I, 10II, . . . ) each frame segment (10) comprising a first connection (11) and a second connection (12) for connecting to another frame segment (10I), a structural support (14) providing a rigid structure between the first connection (11) and the second connection (12), a frame segment surface (15) providing the frame segment (10) with an aerodynamic profile (50) in the flight direction (4), which aerodynamic profile (50) is configured to provide aerodynamic properties to the frame (7), so that when towed by the aircraft (2) via the tow arrangement (8) during survey operation in the flight direction (4), the frame (7) having substantially a fixed frame shape (52) and substantially being in a fixed operational orientation (54).

Item 2. Airborne electromagnetic survey system (1) according to item 1 wherein at least one of the at least one frame segment (10) is configured with an aerodynamic profile (50) with a drag coefficient (60) when towed by the aircraft (2) via the tow arrangement (8) and during survey operation in the flight direction (4), the frame (7) having a drag coefficient (60) less than the drag coefficient resulting from using a frame segment with a circular cross section extending between the first connection and the second connection.

Item 3. Airborne electromagnetic survey system (1) according to any preceding item, wherein at least one of the least one frame segment (10) has an aerodynamic profile (50) of an airfoil (72) with a leading edge (74) in the direction of the flight direction (4) and opposite a trailing edge (76).

Item 4. Airborne electromagnetic survey system (1) according to any preceding item, wherein at least one of the at least one frame segment (10) has at least part of the frame segment surface (70) configured as a vortex generator (80).

Item 5. Airborne electromagnetic survey system (1) according to any preceding item, wherein at least one of the at least one frame segment (10) has at least part of the frame segment surface (70) configured for generating a boundary layer with a turbulent flow for a drag coefficient (60) when towed by the aircraft (2) via the tow arrangement (8) and during survey operation in the flight direction (4), the least one frame segment (10) having a drag coefficient (60) less than the drag coefficient resulting from using a frame segment with a surface configured for generating a boundary layer with a laminar flow when towed by the aircraft (1) via the tow arrangement (8) and during survey operation in the flight direction (4).

Item 6. Airborne electromagnetic survey system (1) according to any preceding item, wherein the at least one frame segment (10) has an aerodynamic profile (50) providing the least one frame segment (10) with a lift force (63) when towed by the aircraft (2) via the tow arrangement (8) and during survey operation in the flight direction (4).

Item 7. Airborne electromagnetic survey system (1) according to any preceding item, wherein at least one of the at least one frame segment (10) has an aerodynamic profile (50) providing the frame (7) with a lift force (63) when towed by the aircraft (2) via the tow arrangement (8) and during survey operation in the flight direction (4).

Item 8. Airborne electromagnetic survey system (1) according to any preceding item, wherein at least one of the at least one frame segment (10) has an aerodynamic profile (50) providing the frame (10) with a lift force (63) when towed by the aircraft (2) via the tow arrangement (8) and during survey operation in the flight direction (4), which lift force (63) is in the opposite direction and in the same order and less than the gravitational force (56) on the frame (7).

Item 9. Airborne electromagnetic survey system (1) according to any preceding item, wherein at least one of the at least one frame segment (10) has an aerodynamic profile (50) providing the frame (1) with a stabilising force towards the intended operational orientation (54) of the frame (7).

Item 10. Airborne electromagnetic survey system (1) according to any preceding item, wherein at least one of the at least one frame segment (10) has an aerodynamic profile (50) providing the frame tail section (19) with a lift force (63) when towed by the aircraft (2) via the tow arrangement (8) and during the survey operation providing a stabilising pitch moment (92).

Item 11. Airborne electromagnetic survey system (1) according to any preceding item, wherein at least one of the at least one frame segment (10) has an aerodynamic profile (50) providing the frame (7) with a lift force (63) when towed by the aircraft (2) via the tow arrangement (8) and during the survey operation providing a stabilising roll moment (94).

Item 12. Airborne electromagnetic survey system (1) according to any preceding item, wherein at least one of the at least one frame segment (10) is configured with at least one spoiler (82) configured to provide an aerodynamic profile (50) with drag coefficient less than that of aerodynamic profile of the frame segment without the spoiler (82) when towed by the aircraft (2) via the tow arrangement (82) and during the survey operation.

Item 13. Airborne electromagnetic survey system (1) according to any preceding item, wherein at least one of the at least one frame segment (10) is configured with at least one spoiler (82) configured to provide an aerodynamic profile (50) that provides the at least one frame segment (10) with lift force (63) when towed by the aircraft (2) via the tow arrangement (8) and during the survey operation.

Item 14. Airborne electromagnetic survey system (1) according to any preceding item, wherein the least one frame segment (10) has an aerodynamic profile (50) that is adjustable.

Item 15. Airborne electromagnetic survey system (1) according to any preceding claim, wherein the frame (7) has a first aerodynamic profile (50A) with aerodynamic properties primarily for survey operation
so that when towed by the aircraft (2) via the tow arrangement (8) during survey operation in the flight direction (4), the frame (7) having substantially a fixed frame shape (52) and substantially being in a fixed survey operational orientation (54A); and a second aerodynamic profile (50B) with aerodynamic properties primarily for ferry operation,
so that when towed by the aircraft (2) via the tow arrangement (8) during ferry operation in the flight direction (4), the frame (7) having substantially a fixed frame shape (52) and substantially being in a fixed ferry operational orientation (54B).

Item 16. Airborne electromagnetic survey system (1) according to any preceding item, wherein the first connection (11) or the second connection (12) are configured to form a rigid connection between one frame segment (10I) and adjacent frame segments (10II, Item 17. Airborne electromagnetic survey system (1) according to any preceding item, wherein the structural support (14) is made of a composite material (84).

Item 18. Airborne electromagnetic survey system (1) according to any preceding item, wherein the structural support (14) is made of a rigid material, such as
a fibre glass and epoxy type structure,
a aramide type fibre structure,
a mixed fibre glass and carbon fibre type structure,
an all carbon fibre type structure, or
a natural fibre type structure.

Item 19. Airborne electromagnetic survey system (1) according to any preceding item, wherein each first connector (11) and second connector (12) are configured to form a rigid frame (7).

Item 20. Airborne electromagnetic survey system (1) according to any preceding item, wherein at least part of the structural support (14) between the first connection (11) and the second connection is a beam (85) with a cross section with an I-profile shape.

Item 21. Airborne electromagnetic survey system (1) according to any preceding item, wherein at least part of the structural support (14) between the first connection (11) and the second connection (12) is a grid type construction.

Item 22. Airborne electromagnetic survey system (1) according to any preceding item, wherein at least part of the structural support (14) between the first connection (11) and the second connection (12) is a shell structure (86) forming the aerodynamic profile (50).

Item 23. Airborne electromagnetic survey system (1) according to any preceding item, wherein at least part of the structural support (14) between the first connection (11) and the second connection (12) is a stiff foamed structure providing stiffness.

Item 24. Airborne electromagnetic survey system (1) according to any preceding item, wherein at least part of the frame segment surface (15) between the first connection (11) and the second connection (12) is a shell structure (86) forming at least part of the aerodynamic profile (50).

Item 25. Airborne electromagnetic survey system (1) according to any preceding item, wherein at least part of the shape of the frame segment surface (15) is formed by a sheet type structure (88) forming the at least part of the aerodynamic profile (50).

Item 26. Airborne electromagnetic survey system (1) according to any preceding item, wherein at least part of the shape of the frame segment surface (15) is formed by a foamed material (87) forming at least part of the aerodynamic profile (50).

Item 27. Airborne electromagnetic survey system (1) according to any preceding item, wherein the frame (7) is a rigid frame (7).

Item 28. Airborne electromagnetic survey system (1) according to any preceding item, wherein the frame (7) has a polygonal shape (16).

Item 29. Airborne electromagnetic survey system (1) according to any preceding item, wherein the tow arrangement (8) is configured to adjust the angle of attack (53) of the frame (7) to direction of flight (5).

Item 30. Airborne electromagnetic survey system (1) according to any preceding item, wherein the tow arrangement (8) is configured to attach to the frame (1) by less than ten tow lines (9) such as three tow lines (9) or six tow lines (9).

Item 31. Airborne electromagnetic survey system (1) according to any preceding item, wherein the magnetic moment (26) is 500,000 Am2 or more.

Item 32. Airborne electromagnetic survey system (1) according to any preceding item, wherein the weight of the frame (7) and the transmitter coil (20) is 350 kg or more.

Item 33. Airborne electromagnetic survey system (1) according to any preceding claims, wherein the frame (7) has a port side and starboard side each comprising at least one section of at least one frame segment (10) where each part side section and starboard section is essentially parallel to the flight direction (4), and where each frame segment (10) in the sections has a cross section profile that is elongated in the vertical direction.

Item 34. Airborne electromagnetic survey system (1) according to any preceding claims, wherein the frame (7) has a port side and starboard side each comprising at least one section of at least one frame segment (10) where each part side section and starboard section is essentially parallel to the flight direction (4), and where each frame segment (10) in the sections has a cross section profile that is essentially elliptical with the major axis essentially oriented the vertical direction.

Item 35. Airborne electromagnetic survey system (1) according to any preceding item, wherein aerodynamic profile (50) is configured to maintain the frame (7) substantially in a fixed operational orientation (54) such as substantially horizontal at least at a flight speed (5) of 140 km/h or above, preferably 150 km/h or above and more preferably 170 km/h or above.

Item 36. Method of geophysical prospecting using an airborne electromagnetic survey system (1) according to any of items 1 to 36.

Item 37. Method of geophysical prospecting using an airborne electromagnetic survey system (1) according to item 33, wherein the aircraft (2) is a helicopter and the flight speed (5) is 140 km/h or above, preferably 150 km/h or above, and more preferably 170 km/h or above.

Item 38. Airborne electromagnetic survey transmitter frame (7) configured for geophysical prospecting by an aircraft (2) configured to lift the transmitter frame (7) tow via a tow arrangement (8) during survey operation in air in a flight direction (4) and with a flight speed (5), which transmitter frame (7) comprises a frame front section (17) in the flight direction (4) and opposite a frame tail section (19) configured to be lifted and towed by the aircraft (2) via the tow arrangement (8) and to support a transmitter coil (20) configured to transmit a magnetic moment (26) for geophysical prospecting (28), which transmitter frame (7) comprises multiple frame segments (10, 10I, 10II, . . . ) each frame segment (10) comprising a first connection (11) and a second connection (12) for connecting to another frame segment (10I), a structural support (14) providing a rigid structure between the first connection (11) and the second connection (12), a frame segment surface (15) providing the frame segment (10) with an aerodynamic profile (50) in the flight direction (4), which aerodynamic profile (50) is configured to provide aerodynamic properties to the transmitter frame (7), where multiple segments (10, 10I, . . . ) are configured to support the transmitter coil (20) so that the transmitter frame (7) substantially defines the shape of the transmitter coil (20) and so that the transmitter frame (7) is substantially rigid; and so that when towed by the aircraft (2) via the tow arrangement (8) during operation in the flight direction (4), the transmitter frame (7) having substantially a fixed frame shape (52) and being substantially in a fixed operational orientation (54) when the transmitter frame (7) experiences a true air speed (6).

Item 39. Transmitter frame (7) according to item 38, wherein the first connection (11) or the second connection (12) are configured to form a rigid connection between one frame segment (10I) and adjacent frame segments (10II, 10III).

Item 40. Transmitter frame (7) according to any of items 38-39, wherein each first connector (11) and second connector (12) are configured to form a rigid transmitter frame (7).

Item 41. Transmitter frame (7) according to any of items 38-40, wherein at least part of the structural support (14) between the first connection (11) and the second connection (12) is a beam (85) with a cross section with an I-profile shape.

Item 42. Transmitter frame (7) according to any of items 38-41, wherein at least part of the structural support (14) between the first connection (11) and the second connection (12) is a shell structure (86) forming the aerodynamic profile (50).

Item 43. Transmitter frame (7) according to any of items 38-42, wherein at least part of the frame segment surface (15) between the first connection (11) and the second connection (12) is a shell structure (86) forming at least part of the aerodynamic profile (50).

Item 44. Transmitter frame (7) according to any of items 38-43, wherein at least one of the one or more frame segments (10) is configured with an aerodynamic profile (50) with a drag coefficient (60) when towed by the aircraft (2) via the tow arrangement (8) and during survey operation in the flight direction (4), the transmitter frame (7) having a drag coefficient (60) less than the drag coefficient resulting from using a frame segment with a circular cross section extending between the first connection and the second connection.

Item 45. Transmitter frame (7) according to any of items 38-44, wherein at least one of the one or more frame segments (10) has an aerodynamic profile (50) providing the frame (1) with a stabilising force towards the intended operational orientation (54) of the transmitter frame (7).

Item 46. Transmitter frame (7) according to any of items 38-45, wherein the aerodynamic profile (50) is configured to maintain the transmitter frame (7) substantially in a fixed operational orientation (54) such as substantially horizontal at least at a true air speed (6) of 140 km/h or above, preferably 150 km/h or above and more preferably 170 km/h or above.

Item 47. Method of geophysical prospecting using an airborne electromagnetic survey system (1) where the frame (7) is according to any of items 1 to 46.

Item 48. Method of geophysical prospecting using an airborne electromagnetic survey system (1) according to item 47, wherein the aircraft (2) is a helicopter and the flight speed (5) is 100 km/h or above and the frame (7) having substantially a fixed frame shape (52) and substantially being in a fixed operational orientation (54).

Item 49. Method of geophysical prospecting using an airborne electromagnetic survey system (1) according to item 48, wherein the aircraft (2) is a helicopter and the true air speed (6) is 140 km/h or above, preferably 150 km/h or above, and more preferably 170 km/h or above.

The above mention itemised embodiments is to be interpreted alone, in connection with the description otherwise, or in connection with the figures.

The invention claimed is:

1. An airborne electromagnetic survey system configured for geophysical prospecting comprising:
   a transmitter frame with a frame front section opposite a frame tail section, the transmitter frame configured to be lifted and towed by an aircraft via a tow arrangement during survey operation in air in a flight direction and with a flight speed, the transmitter frame configured to support a transmitter coil that is configured to transmit an magnetic moment for geophysical prospecting,
   wherein the transmitter frame comprises multiple connectable frame segments, at least one of the frame segments comprising
      a first connection and a second connection configured to form respective rigid connections between the at least one of the frame segments and two other ones of the frame segments that are adjacent the at least one of the frame segments;
      a structural support providing a rigid structure between the first connection and the second connection, wherein the transmitter frame is a substantially rigid frame when the frame segments are connected; and
      a frame segment surface enclosing the structural support, and providing the at least one of the frame segments with an aerodynamic profile, wherein the aerodynamic profile is configured to provide aerodynamic properties to the transmitter frame, and wherein when the transmitter frame is towed by the aircraft via the tow arrangement during the survey operation in the flight direction, the transmitter frame has substantially a fixed frame shape and is substantially in a fixed operational orientation.

2. The airborne electromagnetic survey system according to claim 1, wherein the at least one of the frame segments is configured with an aerodynamic profile having a drag coefficient that is less than a drag coefficient of another frame segment with a circular cross section.

3. The airborne electromagnetic survey system according to claim 1, wherein the at least one of the frame segments has an airfoil aerodynamic profile with a leading edge opposite a trailing edge.

4. The airborne electromagnetic survey system according to claim 1, wherein the at least one of the frame segments has at least a part of the frame segment surface configured for generating a boundary layer with a turbulent flow.

5. The airborne electromagnetic survey system according to claim 1, wherein the at least one of the frame segments is configured to provide the transmitter frame with a lift force when towed by the aircraft via the tow arrangement and during the survey operation in the flight direction, wherein the lift force is in an opposite direction and in a same order or less compared to a gravitational force on the transmitter frame.

6. The airborne electromagnetic survey system according to claim 1, wherein the at least one of the frame segments is configured with at least one spoiler providing a drag coefficient less than that of another frame segment without the spoiler when towed by the aircraft via the tow arrangement and during the survey operation.

7. The airborne electromagnetic survey system according to claim 1, wherein the at least one of the frame segments has at least a part of the frame segment surface configured as a vortex generator.

8. The airborne electromagnetic survey system according to claim 1, wherein the least one of the frame segments has an adjustable aerodynamic profile.

9. The airborne electromagnetic survey system according to claim 1, wherein the transmitter frame has
   a first aerodynamic profile with aerodynamic properties primarily for survey operation so that when towed by the aircraft via the tow arrangement during the survey operation in the flight direction, the transmitter frame is in a fixed survey operational orientation; and
   a second aerodynamic profile with aerodynamic properties primarily for ferry operation,
so that when towed by the aircraft via the tow arrangement during ferry operation in the flight direction, the transmitter frame is in a fixed ferry operational orientation.

10. The airborne electromagnetic survey system according to claim 1, wherein the structural support is made of a composite material.

11. The airborne electromagnetic survey system according to claim 1, wherein the structural support is made of a rigid material, the rigid material comprising:
   a fibre glass and epoxy type structure,
   a aramide type fibre structure,
   a mixed fibre glass and carbon fibre type structure,
   a carbon fibre type structure, or
   a natural fibre type structure.

12. The airborne electromagnetic survey system according to claim 1, wherein each of the first connection and the second connection is configured to provide rigidity for at least a part of the transmitter frame.

13. The airborne electromagnetic survey system according to claim 1, wherein at least a part of the structural support between the first connection and the second connection is a beam with a cross section with an I-profile shape.

14. The airborne electromagnetic survey system according to claim 1, wherein at least a part of the structural support between the first connection and the second connection has a grid type construction.

15. The airborne electromagnetic survey system according to claim 1, wherein at least a part of the structural support between the first connection and the second connection is a shell structure forming the aerodynamic profile.

16. The airborne electromagnetic survey system according to claim 1, wherein at least a part of the structural support between the first connection and the second connection is a stiff foamed structure providing stiffness.

17. The airborne electromagnetic survey system according to claim 1, wherein at least a part of the frame segment surface is between the first connection and the second connection, and comprises a shell structure forming at least a part of the aerodynamic profile.

18. The airborne electromagnetic survey system according to claim 1, wherein at least a part of a shape of the frame segment surface is formed by a sheet type structure forming the at least a part of the aerodynamic profile.

19. The airborne electromagnetic survey system according to claim 1, wherein at least a part of a shape of the frame segment surface is formed by a foamed material forming at least a part of the aerodynamic profile.

20. The airborne electromagnetic survey system according to claim 1, wherein the transmitter frame is a rigid frame.

21. The airborne electromagnetic survey system according to claim 1, wherein the transmitter frame has a polygonal shape.

22. The airborne electromagnetic survey system according to claim 1, wherein the tow arrangement is configured to adjust an angle of attack of the transmitter frame relative to the flight direction.

23. The airborne electromagnetic survey system according to claim 1, wherein the tow arrangement is configured to attach to the transmitter frame by less than ten tow lines.

24. The airborne electromagnetic survey system according to claim 1, wherein the magnetic moment is 500,000 Am2 or more.

25. The airborne electromagnetic survey system according to claim 1, wherein a weight of the transmitter frame and the transmitter coil is 350 kg or more.

26. The airborne electromagnetic survey system according to claim 1, wherein the transmitter frame has a port side and a starboard side, the port side comprising a port side section, the starboard side comprising a starboard side section, the port side section and the starboard side section being parts of the at least one of the frame segments, wherein the port side section and the starboard section are essentially parallel to the flight direction, and wherein each of the port side section and the starboard side section has a cross section profile that is elongated in a vertical direction.

27. The airborne electromagnetic survey system according to claim 1, wherein the transmitter frame has a port side and a starboard side, the port side comprising a port side section, the starboard side comprising a starboard side section, the port side section and the starboard side section being parts of the at least one of the frame segments, wherein the port side section and the starboard section are essentially parallel to the flight direction, and wherein each of the port side section and the starboard side section has a cross section profile that is essentially elliptical with a major axis essentially oriented in a vertical direction.

28. The airborne electromagnetic survey system according to claim 1, further comprising the aircraft configured to lift and tow the transmitter frame via the tow arrangement.

29. The airborne electromagnetic survey system according to claim 1, wherein the aerodynamic profile is configured to maintain the transmitter frame substantially in the fixed operational orientation while the flight speed is 140 km/h or above.

30. The airborne electromagnetic survey system according to claim 1, wherein the aerodynamic properties of the transmitter frame are configured to provide lifting ability for the transmitter frame when towed by the aircraft.

31. The airborne electromagnetic survey system according to claim 1, wherein the aerodynamic profile is non-circular.

32. An airborne electromagnetic survey transmitter frame configured for geophysical prospecting, wherein the transmitter frame is configured to be lifted by an aircraft via a tow arrangement during survey operation in air in a flight direction and with a flight speed, wherein the transmitter frame comprises:
  a frame front section opposite a frame tail section, the transmitter frame configured to support a transmitter coil, the transmitter coil configured to transmit a magnetic moment for geophysical prospecting,
  wherein the transmitter frame comprises multiple connectable frame segments, at least one of the frame segments comprising
    a first connection and a second connection for connecting the at least one of the frame segments to two other ones of the frame segments respectively,
    a structural support providing a rigid structure between the first connection and the second connection, and
    a frame segment surface covering the structural support, and providing the at least one of the frame segments with an aerodynamic profile, wherein the aerodynamic profile is configured to provide aerodynamic properties to the transmitter frame,
  wherein the multiple frame segments are configured to support the transmitter coil so that the transmitter frame substantially defines a shape of the transmitter coil, wherein the transmitter frame is substantially rigid when the frame segments are connected, and wherein when the transmitter frame is towed by the aircraft via the tow arrangement during the survey operation in the flight direction, the transmitter frame has substantially a fixed frame shape and is substantially in a fixed operational orientation when the transmitter frame experiences a true air speed.

33. The transmitter frame according to claim 32, wherein the first connection or the second connection is configured to form a rigid connection between the at least one of the frame segments, and another one of the frame segments that is adjacent the at least one of the frame segments.

34. The transmitter frame according to claim 32, wherein each of the first connection and the second connection is configured to provide a rigid connection.

35. The transmitter frame according to claim 32, wherein at least part of the structural support between the first connection and the second connection is a beam having a cross section with an I-profile shape.

36. The transmitter frame according to claim 32, wherein at least part of the structural support between the first connection and the second connection is a shell structure forming the aerodynamic profile.

37. The transmitter frame according to claim 32, wherein at least part of the frame segment surface between the first connection and the second connection is a shell structure forming at least part of the aerodynamic profile.

38. The transmitter frame according to claim 32, wherein the at least one of the frame segments is configured with an aerodynamic profile with a drag coefficient that is less than a drag coefficient of another frame segment with a circular cross section.

39. The transmitter frame according to claim 32, wherein the at least one of the frame segments has an aerodynamic profile providing the transmitter frame with a stabilising force towards an intended operational orientation of the transmitter frame.

40. The transmitter frame according to claim 32, wherein the aerodynamic profile is configured to maintain the frame substantially in the fixed operational orientation while the flight speed is 140 km/h or above.

41. A method comprising performing geophysical prospecting using the airborne electromagnetic survey system of claim 1 or the transmitter frame of claim 32.

42. The method of claim 41, wherein the geophysical prospecting is performed using a helicopter as the aircraft, and the flight speed is 100 km/h or above.

43. The method of claim 41, wherein the geophysical prospecting is performed using a helicopter as the aircraft, and the flight speed is 140 km/h or above.

44. The airborne electromagnetic survey system according to claim 32, wherein the aerodynamic properties of the transmitter frame are configured to provide lifting ability for the transmitter frame when towed by the aircraft.

45. The transmitter frame according to claim 32, wherein the aerodynamic profile is non-circular.

46. A method of geophysical prospecting using an airborne electromagnetic survey system comprising a transmitter frame with a frame front section opposite a frame tail section, the transmitter frame configured to be lifted and towed by an aircraft via a tow arrangement during survey operation in air in a flight direction and with a flight speed, the transmitter frame configured to support a transmitter coil that is configured to transmit an magnetic moment for geophysical prospecting, wherein the transmitter frame comprises multiple connectable frame segments, at least one of the frame segments comprising (1) a first connection and a second connection configured to form respective rigid connections between the at least one of the frame segments and two other ones of the frame segments that are adjacent the at least one of the frame segments, (2) a structural support providing a rigid structure between the first connection and the second connection, wherein the transmitter frame is a substantially rigid frame when the frame segments are connected, and (3) a frame segment surface enclosing the structural support, and providing the at least one of the frame segments with an aerodynamic profile, wherein the aerodynamic profile is configured to provide aerodynamic properties to the transmitter frame, and wherein when the transmitter frame is towed by the aircraft via the tow arrangement during the survey operation in the flight direction, the transmitter frame has substantially a fixed frame shape and is substantially in a fixed operational orientation, the method comprising:

supporting the transmitter coil that is configured to transmit the magnetic moment for the geophysical prospecting on the transmitter frame;

lifting, by the aircraft, the transmitter frame via the tow arrangement;

towing the transmitter frame in the air in the flight direction and with the flight speed; and operating the aircraft in the flight direction and with the flight speed so that air flow over the aerodynamic profiles of the frame segments provides lift to the frame segments.

* * * * *